(12) United States Patent
Tsuda et al.

(10) Patent No.: US 6,289,154 B1
(45) Date of Patent: Sep. 11, 2001

(54) GRATING-TYPE OPTICAL COMPONENT AND METHOD OF MANUFACTURING THE SAME

(75) Inventors: Toshiaki Tsuda; Ikuo Ota; Toshihiko Ota; Yasuhiro Ibusuki; Shigehito Yodo, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/184,968

(22) Filed: Nov. 3, 1998

(30) Foreign Application Priority Data

| Nov. 4, 1997 | (JP) | 9-301934 |
| May 6, 1998 | (JP) | 10-123512 |
| May 12, 1998 | (JP) | 10-146629 |
| May 12, 1998 | (JP) | 10-146630 |
| May 12, 1998 | (JP) | 10-146631 |
| May 13, 1998 | (JP) | 10-148436 |

(51) Int. Cl.⁷ .................................................. G02B 6/34
(52) U.S. Cl. .............................. 385/37; 385/14; 385/15; 385/31
(58) Field of Search ................................ 385/14, 15, 37, 385/31, 124, 141, 43, 123

(56) References Cited

U.S. PATENT DOCUMENTS 5,502,786 * 3/1996 Inniss et al. .................... 385/123

FOREIGN PATENT DOCUMENTS

WO 00/29881 * 5/2000 (WO) ........................... 385/14

* cited by examiner

*Primary Examiner*—Cassandra Spyrou
*Assistant Examiner*—Craig Curtis
(74) *Attorney, Agent, or Firm*—Armstrong, Westerman, Hattori, McLeland & Naughton, LLP

(57) ABSTRACT

A grating-type optical component having a high isolation ability at a light-blocking band and a small clad layer mode combination loss at a signal transmission band, and its manufacturing method are provided. A selected area on a core of an optical fiber is irradiated by ultraviolet beams emitted from an excimer laser source through a phase mask in order to produce high index of refraction areas and low index of refraction areas arranged alternately and periodically along the longitudinal axis of the optical fiber. This ultraviolet irradiation is terminated before the index of refraction, which is increasing due to the ultraviolet irradiation, reaches a target value. Then, the phase mask is removed, and the selected area of the core is again irradiated by ultraviolet beams, thereby completing the grating-type optical fiber.

7 Claims, 19 Drawing Sheets

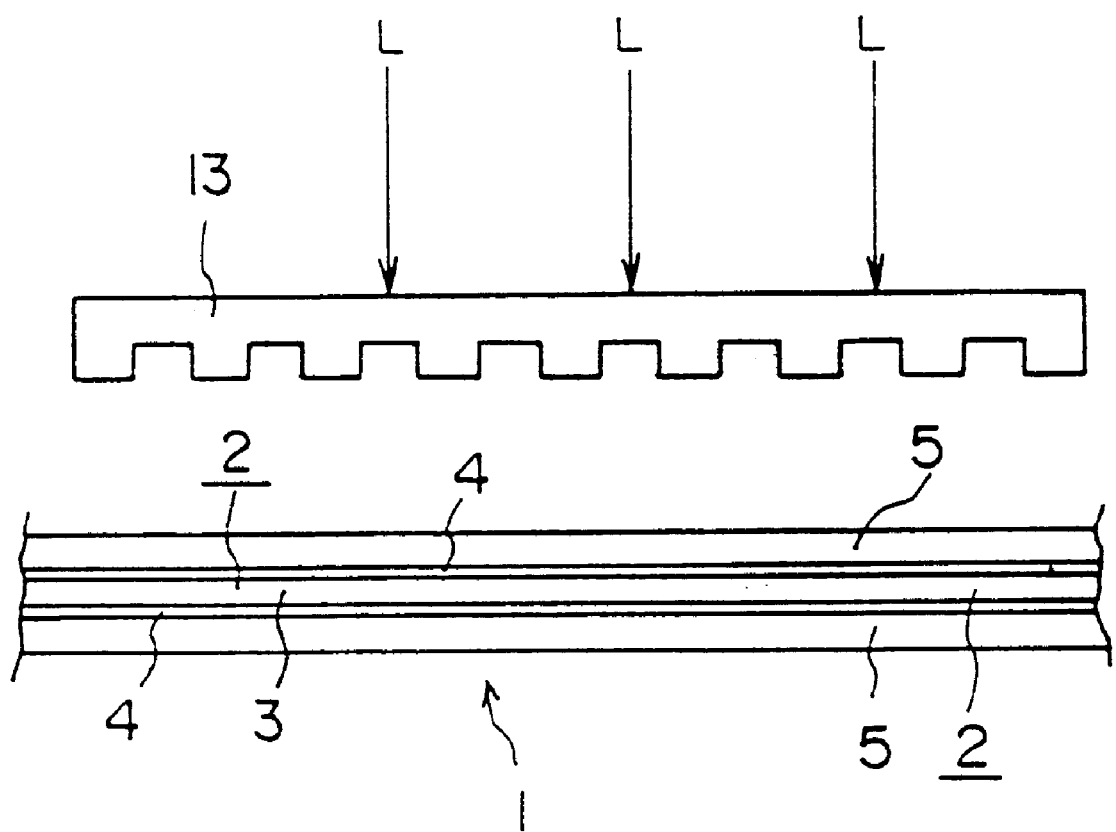

GRATING-TYPE OPTICAL COMPONENT AND METHOD OF MANUFACTURING THE SAME

BACKGROUND OF THE INVENTION

1. Field of the Invention

This invention relates to a grating-type optical component, in which a grating is formed in specific areas of an optical waveguide, such as an optical fiber, and to a method of manufacturing the same.

2. Description of the Related Art

Along with the growth of information industries, the amount of information communicated is rapidly increasing, and high bit rate transmission fiber optics communication systems are becoming indispensable. In recent years, a wavelength multiplex transmission technique for transmitting signal light containing multiple different wavelengths through a single optical fiber has been studied as an approach to the high-speed large-capacity communication systems.

In connection with such wavelength multiplex transmission and communication systems, a study has been conducted for selectively reflecting a light component having a specific wavelength band from among the wavelength-multiplex transmission light in order to use this reflected light as a system monitoring light. A filter is generally used to selectively reflect the light component of a specific wavelength band, while the rest of the light components are transmitted through the fiber. In order to filter a specific light component, it has been proposed to form a grating directly on a selected area of an optical waveguide, e.g., a single-mode optical fiber. Such a grating-type optical component is also attracting a great deal of attention as one approach to a distribution compensation technique for achieving high bit rate transmission fiber optics communication.

A conventional single-mode optical fiber (or the optical waveguide) mentioned above has a core and a clad layer surrounding the core. This single-mode optical fiber has a step-type or rectangular distribution profile of index of refraction in the radial direction of the optical fiber, as shown by the solid line "a" in FIG. 6. The index of refraction is substantially constant in the core in the radial direction of the optical fiber, and the index of refraction of the clad layer surrounding the core is also constant, but has a value different from the core, in the radial direction. This means that the index of refraction of the fiber drastically changes at and near the boundary between the core and the clad layer in the radial direction. In this conventional single-mode optical fiber, the specific refraction differential Δ1, of the core, relative to pure silica, is set greater than the specific refraction differential Δ3, of the clad layer, relative to pure silica.

The specific refraction differential Δ1, of the core, relative to pure silica, and the specific refraction differential Δ3, of the clad layer, relative to pure silica, are defined by equations (1) and (2), respectively.

$$\Delta 1 = [(n_c^2 - n_0^2)/2 \cdot n_c^2] \cdot 100 \quad (1)$$

$$\Delta 3 = [(n_L^2 - n_0^2)/2 \cdot n_L^2] \cdot 100 \quad (2)$$

where $n_0$ is the index of refraction of pure silica (i.e., silica; $SiO_2$), $n_L$ is the index of refraction of the clad layer surrounding the core, and $n_c$ is the index of refraction of the core.

In the example shown in FIG. 6, Δ1 is 0.3% and Δ3 is 0%, which results in the rectangular refractive index profile indicated by the solid line "a". In this case, the clad layer of the single-mode optical fiber is made of pure silica ($n_L = n_0$).

A grating is formed on this grating-type optical component in order to produce a light-blocking region, whereby a part of the propagating light having a specific wavelength band, which is different from the signal transmission wavelength band, is blocked or reflected by the grating. In other words, signal light is transmitted through the optical fiber from the input terminal to the output terminal, while the light component having the wavelength of the prescribed light-blocking band is reflected back to the input terminal, which is then extracted as monitoring light.

The grating is formed generally by irradiating the optical waveguide (e.g., the optical fiber) with ultraviolet beams through a phase mask. The ultraviolet beams are diffracted by the phase mask and, therefore, the optical waveguide is illuminated by the diffraction light. Those areas on the core exposed to the ultraviolet beams become high refractive index areas because the ultraviolet beams excite a rare-earth element (e.g., germanium (Ge)) doped in the core, which causes the index of refraction of the illuminated areas to increase by an optical inductive effect. On the other hand, the non-exposed areas of the core become low refractive index areas because no change occurs in the index of refraction. The high-refraction areas and the lower-fraction areas are alternately formed along the longitudinal axis of the core. As the grating formation method, a holographic method, without using a mask, is also known, other than the phase mask method. With a holographic method, two coherent ultraviolet beams interfere with each other, and the optical waveguide is irradiated by the interference light, whereby a grating is formed. (Appl. Phys. lett., 62, 1035, 1993)

In wavelength multiplex transmission systems, it has been proposed to use the 1550 nm wavelength band as a signal transmission band, and use the light component having the wavelength of about 1650 nm as monitoring light.

This is because, in parallel with the development of wavelength multiplex transmission systems, optical fiber amplifiers using erbium doped fibers, which can amplify the optical signals (or the signal light), have also been developed in order to achieve high bit rate transmission optical communication systems, and because the gain regions of such erbium-added fibers are about 1550 nm. If the wavelength of the transmitted signal light is set to 1550 nm, the monitoring light must have some other wavelengths within the range below the cutoff wavelength (about 1700 nm). Therefore, 1650 nm is preferably chosen for the wavelength band of the monitoring light. If the wavelength of the monitoring light exceeds 1700 nm, a portion of the propagation light is lost, which is undesirable.

However, this conventional grating-type optical component using a single-mode optical fiber has some problems. If the light component having a wavelength of about 1650 nm is selectively reflected, a large transmission loss occurs at and near 1520 nm, as shown in FIG. 7A.

This wavelength band, at which such a large light-transmission loss occurs depends on the wavelength of the reflection band (or the light-blocking band) of the fiber grating. Meanwhile, it is generally known that the transmission loss is caused by a clad-mode coupling loss which results from a phenomenon that the propagation mode, in which the propagating light tends to propagate through the core passing through the fiber grating, is coupled with the reflection mode, in which a portion of the light reflected by the fiber grating oozes into the clad layer and propagates through the clad layer.

Accordingly, if the conventional grating-type optical component having a light-blocking band of about 1650 nm is used in a wavelength multiplex transmission system in order to reflect or extract the monitoring light, while the monitoring light is effectively extracted, the intensity of the transmitted signal light, whose wavelength is about 1550 nm, inevitably drops at and near 1520 nm.

SUMMARY OF THE INVENTION

Therefore, it is an object of the present invention to overcome the problems in the prior art and provide a high-isolation grating-type optical component which can reduce the clad-mode combination loss in the optical waveguide (e.g., the optical fiber) with a grating. It is another object of the present invention to provide a high-isolation grating-type optical component which can reliably reflect a portion of the light at a monitoring wavelength band, while reducing a light-transmission loss at the signal transmission band. It is still another object of the present invention to provide a method for manufacturing such a grating-type optical component.

In order to achieve the above-described objects, a grating-type optical component comprises an optical waveguide having a core, and a grating is formed on a selected area of the core by first irradiation of interference light or diffraction light of ultraviolet beams from one side of the optical waveguide toward a plane including the core, and subsequent second irradiation of uniform ultraviolet beams.

Preferably, the optical waveguide is a single-peak optical fiber having a core and a clad layer surrounding the core. The single-peak optical fiber has a power-$\alpha$ distribution profile of index of refraction, and the grating is formed on the core such that the index of refraction of the core varies periodically along the optical axis of the single-peak optical fiber.

The value of $\alpha$ is preferably less than 1.5.

The index of refraction of the clad layer is substantially equal to the index of refraction of pure silica, and the specific refraction differential $\Delta$ of the core relative to pure silica is greater than 0.5%.

The light-blocking wavelength band of the grating is about 1640 nm to 1660 nm, and the transmission wavelength of the optical waveguide is about 1550 nm.

In another aspect of the present invention, a grating-type optical component comprises an optical fiber having a center core with a specific refraction differential $\Delta 1$ relative to pure silica, a side core surrounding the center core and having a specific refraction differential $\Delta 2$ relative to pure silica, and a clad layer surrounding the side core and having a specific refraction differential $\Delta 3$ relative to pure silica. This optical fiber has a W-type refractive index profile which satisfies the relation $\Delta 1 > \Delta 3 > \Delta 2$, and a grating is formed on the optical fiber such that the index of refraction of the center core periodically varies along the optical axis of the optical fiber.

Preferably, the absolute value of the specific refraction differential $\Delta 1$ of the center core relative to pure silica is greater than the absolute value of the specific refraction differential $\Delta 2$ of the side core relative to pure silica.

Preferably, the specific refraction differential $\Delta$ of the center core relative to pure silica is greater than 0.5%.

Again, the light-blocking wavelength band of the grating is about 1640 nm to 1660 nm, and the transmission wavelength of the optical fiber is about 1550 nmn.

In still another aspect of the invention, a grating-type optical component comprises a co-doped optical fiber having a core, in which a dopant for increasing the index of refraction is doped, and a clad layer surrounding the core, in which a dopant for increasing the index of refraction and a dopant for decreasing the index of refraction are doped. The index of refraction of the clad layer is substantially equal to the index of refraction of pure silica. A grating is formed on the co-doped optical fiber such that indexes of refraction of both the core and the clad layer periodically change along the optical axis of the optical fiber.

The specific refraction differential $\Delta$, of the doped core, relative to pure silica, is preferably greater than 0.3%.

The light-blocking wavelength band defined by this grating is about 1640 nm to 1660 nm, and the transmission wavelength of the optical fiber is about 1550 nm.

In still another aspect of the present invention, a method for manufacturing a grating-type optical component is provided, which comprises an optical waveguide having a core. The method comprises the steps of irradiating the optical waveguide with ultraviolet rays from one side of the optical waveguide toward a plane including the core through a phase mask, and irradiating the entire surface of the optical waveguide with ultraviolet beams from the other side of the optical waveguide.

In still another aspect of the present invention, a second method for manufacturing a grating-type optical component which comprises an optical waveguide having a core is provided. The second method comprises the steps of forming a grating in a desired area of the core along the longitudinal axis of the core making use of interference of ultraviolet beams, and irradiating the desired area and its neighborhood uniformly with ultraviolet beams.

In still another aspect of the invention, a third method for manufacturing a grating-type optical component is provided which comprises an optical waveguide having a core and a clad layer. The third method comprises the steps of giving first irradiation of ultraviolet beams to a desired area of the optical waveguide through a mask, and thereafter, giving second irradiation of ultraviolet beams without the mask, thereby forming a grating in which high-refraction areas, due to double irradiation, and low-refraction areas, due to blocking the ultraviolet beams by the mask, are periodically arranged along the longitudinal axis of the optical waveguide.

In still another aspect of the present invention, a fourth method for manufacturing a grating-type optical component is provided which comprises an optical waveguide having a core and a clad layer. The fourth method comprises the steps of giving first irradiation of ultraviolet beams to a desired area of the optical waveguide through a mask in order to increase the index of refraction of the core, terminating the first irradiation before the index of refraction of the core irradiated by the ultraviolet beams reaches a target value, and thereafter, giving second irradiation of ultraviolet beams to the desired area without the mask. The first irradiation is conducted, while monitoring a transmission loss of the waveguide or time elapsed from the beginning of the first irradiation, and it is terminated when the transmission loss or the rate of change of the transmission loss re aches a predetermined value , or when the time elapsed from the beginning of the first irradiation reaches a predetermined value, thereby forming a grating in which high-refraction areas, due to double irradiation, and low-refraction areas, due to blocking of the ultraviolet beams by the mask, are periodically arranged along the longitudinal axis of the optical waveguide.

The second irradiation may also be conducted while monitoring a transmission loss of the waveguide or time elapsed from the beginning of the first irradiation, and terminated when the transmission loss or the rate of change of the transmission loss reaches a predetermined value, or when the time elapsed from the beginning of the first irradiation reaches a predetermined value.

The predetermined value set for the transmission loss or the rate of change of the transmission loss, and the predetermined value set for the time elapsed, at which the first irradiation is terminated, correspond to a point in time at which the transmission loss drastically changes during the first irradiation.

Having conducted thorough studies and research, the present inventors found that the transmission loss in an optical waveguide, o n which a grating was formed by irradiation of ultraviolet beams, can be prevented from further increasing, if the optical waveguide is again irradiated by ultraviolet beams from the rear side of the grating. Based on this discovery, the grating-type optical component in the first aspect of the invention can suppress the clad layer mode combination loss from increasing by two-step irradiation of ultraviolet beams, namely, first irradiation of interference light or diffraction light of ultraviolet beams from one side of the optical waveguide toward a plane including the core, and second uniform irradiation of ultraviolet beams.

Meanwhile, in a single-mode optical fiber used in a conventional optical component, while the index of refraction of the optical fiber drastically changes at the boundary between the core and the clad layer, as indicated by the characteristic line "a" in FIG. 6, the propagation mode of the optical fiber gently changes in the radial direction of the optical fiber, as shown by the dotted broken line "b" in FIG. 6. The inventors infer that the gap between the abrupt change of the index of refraction at the core-clad layer boundary and the gentle change of the propagation mode causes the clad layer mode combination loss to increase, which further causes a large transmission loss at and near the 1520 nm band.

In order to reduce the clad layer mode combination loss, the inventors propose to reduce the gap between the change of the index of refraction and change of the propagation-mode at the core-clad layer boundary, and to use a single-peak optical fiber having a power-$\alpha$ distribution profile of the index of refraction (i.e., having a distribution profile defined by a curve expressed as $y=-x^\alpha$ centering on the center of the core). A grating is formed on this single-peak optical fiber such that the light-block wavelength band of the grating is 1640 nm to 1660 nm.

Having observed the relationship between the transmission loss in this optical fiber and the wavelength, it was confirmed that the grating-type optical component using a single-peak optical fiber, in which a grating is formed, can reduce the transmission loss at and near the 1520 nm band, as compared to the conventional grating-type optical component using a single-mode optical fiber. In particular, the transmission loss is effectively reduced if the value of $\alpha$ is less than 1.5.

This is because the distribution profile of the index of refraction of the single-peak optical fiber does not drastically change at the core-clad layer boundary, and because it changes gently in the radial direction of the optical fiber with less gap from the change of the propagation mode, unlike the single-mode optical fiber.

Because the single-peak optical fiber, which has a power-$\alpha$ distribution profile of the index of refraction, is used in the grating-type optical component provided in the first aspect of the present invention, the transmission loss at and near 1520 nm can be reduced, with the light-blocking wavelength band of 1640 nm to 1660 nm, and wavelength multiplex transmission is reliably conducted at the 1550 nm band without causing intensity drop of signal light.

With less difference between the change of the index of refraction and the change of the propagation mode, the clad layer mode combination loss can be reduced. In particular, if the $\alpha$ value is less than 1.5, both the clad layer mode combination loss and the transmission loss can be effectively reduced.

In addition to these advantages, because the index of refraction of the clad layer is substantially equal to the index of refraction of pure silica, and because the specific refraction differential $\Delta$, of the core, relative to pure silica, is greater than 0.5%, time required for the light-blocking wavelength band of the grating to exhibit a prescribed function can be reduced. Since the clad layer mode combination loss is proportional to this time, the clad layer mode combination loss can also be reduced.

In the second aspect of the present invention, the core, which is surrounded by the clad, consists of a center core and a side core. Assume that the specific refraction differential of the center core relative to pure silica is $\Delta 1$, that the specific refraction differential of the side core relative to pure silica is $\Delta 2$, and that the specific refraction differential of the clad relative to pure silica is $\Delta 3$, then the optical fiber satisfies the relation $\Delta 1 > \Delta 3 > \Delta 2$, which is named a W-type distribution profile of index of refraction. The light propagating through the core tends to ooze into the clad layer from the side core, which results in a decreased propagation mode, as compared with a conventional single-mode optical fiber having a rectangular distribution profile of index of refraction indicated by the characteristic line "a" in FIG. 6.

As has been explained, the clad layer mode combination loss is caused by the combination of the propagation mode, in which light tends to propagate through the core confining itself in the core, and the reflection mode, in which the light reflected by the grating oozes into the clad layer. Accordingly, if the propagation mode can be decreased, the clad layer mode combination loss can also be reduced.

This W-type optical fiber according to the second aspect of the present invention can achieve the same effect as the first and second aspects of the present invention. With the light-blocking wavelength band of 1640 nm to 1660 nm, the transmission loss at and near the 1520 nm band can be reduced, and wavelength multiplex transmission is reliably conducted at the 1550 nm transmission band without causing signal intensity drop.

In addition, because the absolute value of the specific refraction differential $\Delta 1$ of the center core relative to pure silica is set greater than the absolute value of the specific refraction differential $\Delta 2$ of the side core relative to pure silica, the clad layer mode combination loss can be effectively reduced, while the light-propagation property is well maintained.

The specific refraction differential $\Delta 1$ of the center core relative to pure silica is set greater than 0.5%. Again, time required for the light-blocking wavelength band of the grating to exhibit a prescribed function can be reduced, and the clad layer mode combination loss, which is proportional to the above-mentioned time, can also be reduced.

In the third aspect of the present invention, a co-doped optical fiber is used in order to reduce the gap between the change of the index of refraction and the change of the propagation mode in the radial direction at the core-clad layer boundary. The distribution profile of the index of refraction of the co-doped optical fiber gently changes at the core-clad layer boundary, as compared with a single-mode optical fiber. Again, under the condition of the light-blocking wavelength band of 1640 nm to 1660 nm, the relationship between the transmission loss of this co-doped optical fiber and the wavelength was observed.

As the observation result, it was confirmed that the grating-type optical component using the co-doped optical fiber with a grating can effectively reduced the transmission loss at the 1520 nm band, as compared with the conventional grating-type optical component using a single-mode optical fiber.

In the co-doped optical fiber, a dopant (e.g., germanium) for increasing the index of refraction is doped in both the core and the clad layer. In response to irradiation of ultraviolet beams, the index of refraction of the dopant (e.g., germanium) increases. As a result, the distribution profile of index of refraction of this co-doped optical fiber becomes the one shown in FIG. 12A. The grating is formed on the co-doped optical fiber, as shown in FIG. 12B, such that indexes of refraction of both the core and the clad layer periodically change along the optical axis of the optical fiber.

The change of the index of refraction of the co-doped optical fiber is gentle at the core-clad layer boundary, as compared with a single-mode optical fiber. When the index of refraction of the dopant (e.g., germanium) is increased by ultraviolet irradiation, the distribution profile of the co-doped optical fiber shift upwardly, while maintaining a gentle curve, as indicated by the characteristic lines b and c in FIG. 12A. This arrangement can reduce the clad layer mode combination loss.

As a significant feature, a dopant for increasing the index of refraction, and a dopant for decreasing the index of refraction are doped in the clad layer. The index of refraction of the clad layer is set substantially equal to the index of refraction of pure silica. The grating is formed on this co-doped optical fiber such that indexes of refraction of both the core and the clad layer periodically change along the optical axis of the optical fiber. With the light-blocking wavelength band of 1640 nm to 1660 mn, the transmission loss at and near the 1520 nm band can be reduced, and wavelength multiplex transmission is reliably conducted at the 1550 nm band without causing signal intensity drop.

With this co-doped optical fiber containing different types of dopants, the gap between the change of the index of refraction and the change of the propagation mode at the core-clad layer boundary can be reduced and, therefore, the clad layer mode combination loss can be reduced.

The specific refraction differential $\Delta$, of the core, relative to pure silica, is greater than 0.3%. Time required for the light-blocking wavelength band of the fiber grating to exhibit a prescribed function can be reduced, and the clad layer mode combination loss which is proportional to the above-mentioned time can also be reduced.

The two-step irradiation of ultraviolet beams, i.e., the first irradiation through a phase mask and the second irradiation without the phase mask, can further reduce the clad layer mode combination loss.

With the light-blocking wavelength band of 1640 nm to 1660 nm and the signal transmission band of about 1550 nm, the transmission loss at and near the 1520 nm band can be eliminated, and wavelength multiplex transmission is reliably conducted at the 1550 nm band without causing signal intensity drop. Furthermore, a light component having a wavelength of the light-blocking band of the grating is reliably extracted from the propagation light, and is used as monitoring light, whereby a wavelength multiplex transmission system having an excellent communication quality can be achieved.

Having observed the relationship between the grating formation process and the transmission property (or the transmission loss) of the resultant grating-type optical component, the present inventors found that while the first irradiation of interference or diffraction beams causes a clad layer mode combination loss during the grating formation, the subsequent irradiation of uniform and non-interference (or non-diffraction) beams onto the entire area of the grating can reduce the clad layer mode combination loss caused by the first irradiation.

Because the manufacturing method of a grating-type optical component, according to the present invention, simply requires two-step irradiation of ultraviolet beams, high-quality grating-type optical components with less transmission loss can be manufactured at a low cost.

A desired area of an optical fiber is irradiated by ultraviolet beams through a mask in the first irradiation in order to form a grating. This first irradiation is terminated before the index of refraction of the core reaches a target value. Then, the mask is removed, and the area on which the grating was formed is again irradiated by ultraviolet beams without the mask (i.e., the second irradiation). This two-step irradiation can greatly reduce the clad layer mode combination loss which generally occurs in the shorter wavelength side of the light-blocking band.

By terminating the first irradiation before the index of refraction of the core reaches the target value, the transmission loss in the light-blocking wavelength band can be naturally decreased.

To be more precise, because the period of the first irradiation is shortened, the clad layer mode combination loss generated during the first irradiation for forming the grating is also decreased. This clad mode combination loss is substantially eliminated by the subsequent irradiation of ultraviolet beams without the mask. If the wavelength of the light-blocking band is set to 1650 nm, clad layer mode combination loss generally arises at 1550 nm which is the transmission band of a wavelength multiplex transmission system using a conventional optical component. The present invention can eliminate this clad layer mode combination loss at the 1550 nm transmission band by the second ultraviolet irradiation, and improve the reliability of multiplex transmission at the transmission wavelength band.

Furthermore, by terminating the first irradiation before the index of refraction of the core reaches the target value, the transmission loss in the light-blocking, which is caused by the second irradiation and required for extracting monitoring light, can be increased.

In particular, by terminating the first irradiation of ultraviolet beams at a point at which the index of refraction or the transmission loss drastically increases, an optical component having an ideal property, with a small clad layer mode combination loss in the signal transmission band and a large transmission loss in the light-blocking band, is achieved.

This method only requires controlling the termination of the first and second irradiation and removing the mask prior to the second irradiation. Thus, reliable optical components having superior properties can be produced at a low cost by simple control of ultraviolet irradiation.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawing figures, in which:

FIG. 11 is a cross-sectional view showing how the fiber grating of the second embodiment is formed;

FIG. 15A is a spectrum diagram showing the transmission loss of the grating-type optical component manufactured according to the method of the present invention, while

DETAILED DESCRIPTION OF THE PREFERRED EMBODIMENTS

Figure 1A:
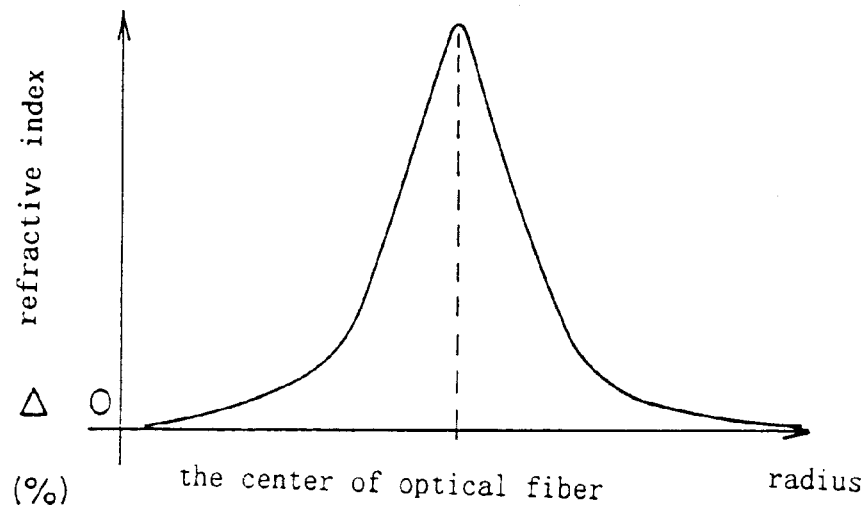
FIG. 1A illustrates the distribution profile of the index of refraction of a grating-type optical component according to the first embodiment of the present invention.
Figure 1B:
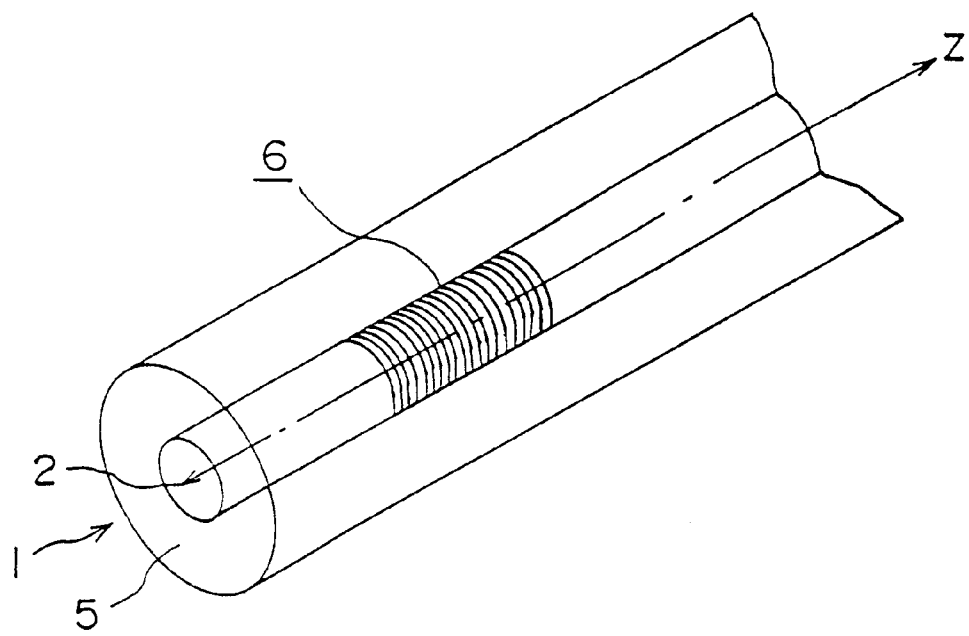
FIG. 1B illustrates the major part of the grating-type optical component.

The preferred embodiments of the present invention will now be described in detail with reference to the attached drawing figures. FIG. 1A illustrates the distribution profile of the index of refraction of a grating-type optical component according to the first embodiment of the present invention, and FIG. 1B is a perspective view of the major part of the grating-type optical component.

The grating-type optical component comprises a single-peak-type optical fiber 1 which has a core 2 and a clad layer 5 surrounding the core 2. A grating 6 is formed in a part of the core so that the index of refraction of the core 2 periodically changes along the optical axis Z of the optical fiber 1. The single-peak optical fiber 1 has a power-α distribution profile of the index of refraction. In the first embodiment, the value of α is set to 0.5, which is less than 1.5, i.e. the α value at which transmission loss is effectively reduced.

The clad layer 5 is made of pure silica ($SiO_2$), and the core 2 is made of silica in which germanium is doped in order to increase the index of refraction. The specific refraction differential Δ1 of the core 2 relative to pure silica is greater than 0.5%, (preferably, greater than 1.0%). The upper limit of the specific refraction differential Δ1 is the maximum value which can be achieved by the current technology, that is, about 2.8%; however, it may be set higher as the technology progresses.

The light-blocking wavelength band by the fiber grating 6 is set to range from 1640 nm to 1660 nm, and the optical fiber transmission wavelength is about 1550 nm. The fiber grating 6 is formed by two-step irradiation of ultraviolet beams. During the first irradiation, the single-peak optical fiber 1 is irradiated through a phase mask. The phase mask is removed during the second irradiation.

Figure 4:
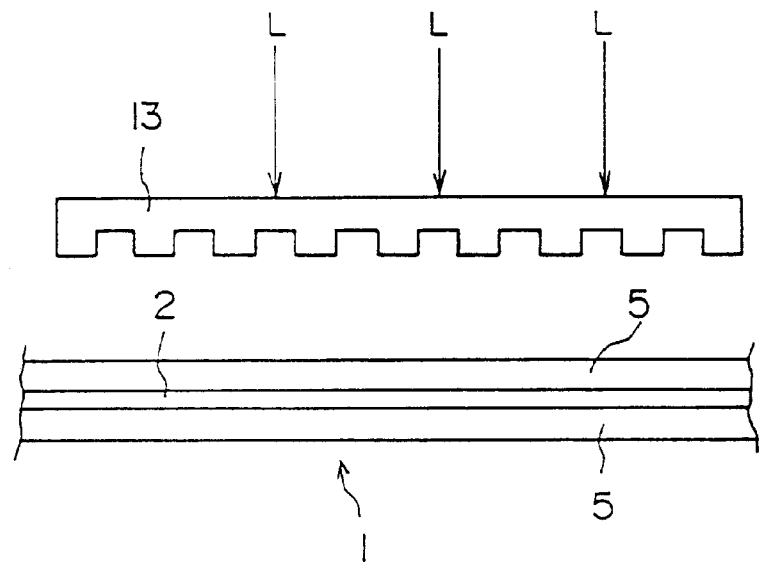
FIG. 4 is a cross-sectional view showing how the fiber grating of the first embodiment is formed.

Prior to the irradiation, the outermost protection layer (not shown) is stripped off of a predetermined length so that a part of the optical fiber 1 is exposed to the atmosphere. The exposed portion of the optical fiber 1 is subjected to pressurized hydrogen treatment for the purpose of improving the optical inductive property. Then, as shown in FIG. 4, ultraviolet laser beams L are emitted through the phase mask 13, whereby the index of refraction of the germanium doped in the core 2 is increased. Then, the phase mask 13 is removed, and the optical fiber 1 is again exposed to the ultraviolet laser beam L in order to further increase the index of refraction of the germanium in the core 2. Thus, the fiber grating is completed.

The laser source is, for example, an excimer laser having a wavelength of 248 nm and an output of 350 mW. Irradiation time is several minutes to several tens of minutes. The mask pitch of the phase mask 13 is preferably 1138 μm, the zero-order diffraction light transmissivity of the mask 13 is preferably 1%, and the first-order diffraction light transmissivity of the mask 13 is preferably 40%. These conditions allow the grating to be formed precisely.

Figure 6:
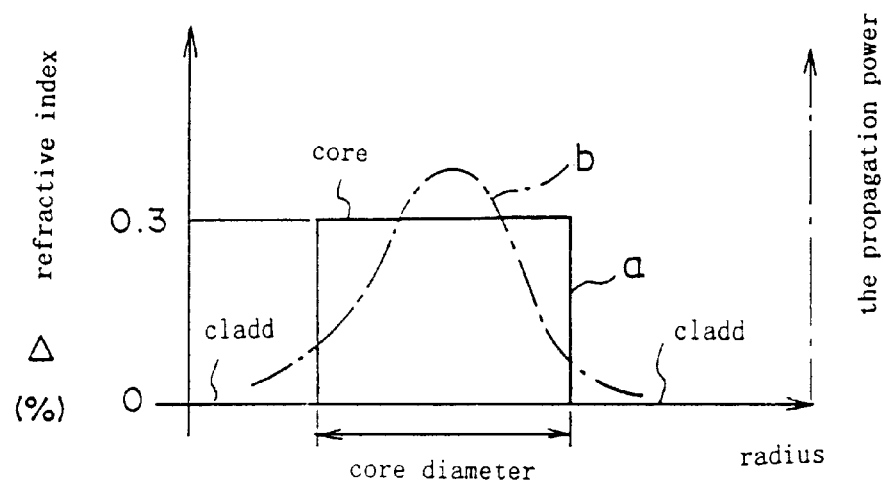
FIG. 6 illustrates examples of the refractive index distribution and the propagation-mode distribution of a single-mode optical fiber in the radial direction.

If a conventional single-mode optical fiber having a distribution profile of the index of refraction shown by the solid line "a" in FIG. 6 is used to form a grating-type optical component with the light-blocking wavelength band of 1640 nm to 1660 nm, the clad layer mode combination loss becomes large due to the gap between the distribution profile of the index of refraction, which drastically changes at the boundary between the core 2 and the clad layer 5, and the propagation-mode profile, which gently curves in the radial direction of the optical fiber. The inventors of the present invention infer that the clad layer mode combination loss causes a transmission loss near 1520 nm. In order to reduce the clad layer mode combination loss, the inventors propose to reduce the gap between the change of the index of refraction and change of the propagation-mode at the boundary between the core 2 and the clad layer 5, and to produce the grating-type optical component of the first embodiment, in which a grating 6 is formed in a part of a single-peak optical fiber 1 whose index of refraction has a power-α distribution profile.

In order to support the inference, various single-peak optical fibers 1 having different α values were prepared, and a grating 6 is formed in each optical fiber 1 such that the light-blocking wavelength and is about 1640 nm to 1660 nm. Then, the relationship between the transmission loss of each optical fiber 1 and the wavelength was observed. It was confirmed that the grating-type optical component using a single-peak optical fiber 1, in which a grating 6 is formed, can reduce the clad layer mode combination loss regardless of the α value, as compared to the conventional grating-type optical component using a single-mode optical fiber. In particular, the transmission loss is effectively reduced when the α value of the single-peak optical fiber 1 is less than 1.5.

In the single-peak optical fiber 1, the distribution profile of the index of refraction does not drastically change at the boundary between the core 2 and the clad layer 5, and it changes gently in the radial direction of the optical fiber, unlike the single-mode optical fiber 1. In particular, with a small value of α, the gap between the distribution profile of the index of refraction and the propagation-mode distribution profile in the radial direction can be effectively reduced, and the clad layer mode combination loss is also reliably reduced. Therefore, the α value is set to 0.5 as the preferred mode.

In addition, various single-peak optical fibers 1 with different values of specific refraction differential Δ1 of the core 2 relative to pure silica, all of which have gratings whose light-blocking wavelength band is 1640 nm to 1660 nm, were prepared. Then, the transmission losses of these optical fibers 1 at 1550 nm were measured in order to observe the relationship between the transmission loss and the specific refraction differential Δ1 of the core 2.

Figure 3:
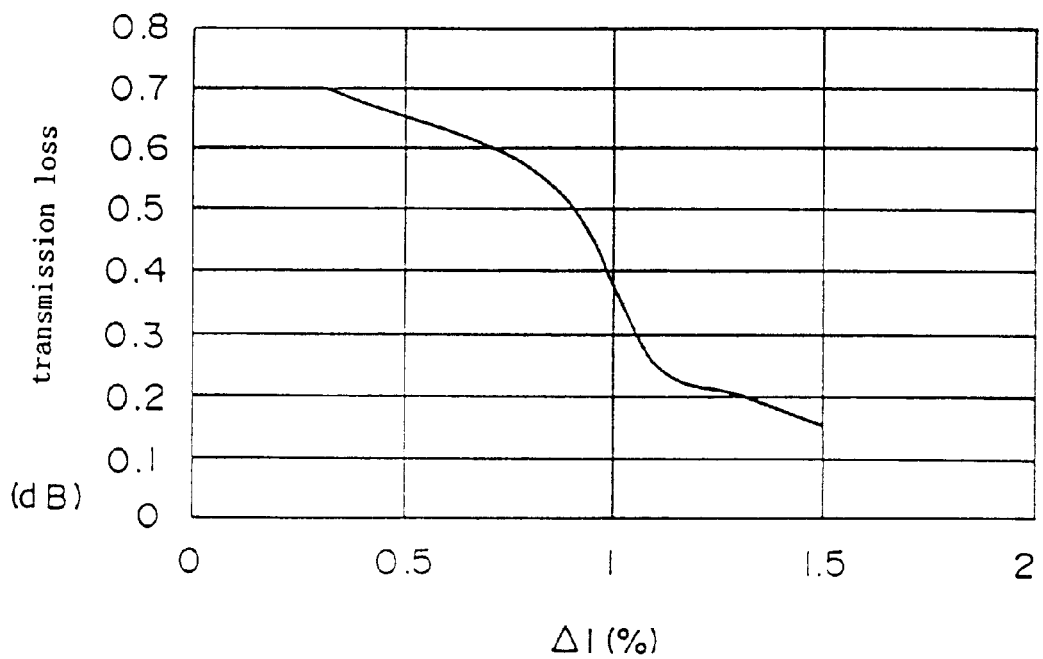
FIG. 3 is a graph showing the transmission loss of a single-peak-type optical fiber as a function of the specific refraction differential Δ1 of the core relative to pure silica.

The measurement result is shown in FIG. 3. As is clear from this figure, if the specific refraction differential Δ1 exceeds 0.5%, the transmission loss decreases. If the Δ1 value exceeds 0.8%, the transmission loss further decreases. Above 1.2%, the transmission loss still decreases gently, which allows the clad layer mode combination loss to be reduced. Based on this result, in the first embodiment, the specific refraction differential Δ1 of the core 2, relative to pure silica, is set greater than 0.5%, and more preferably, greater than 1.0%.

As to the relationship between the specific refraction differential Δ1 and time required for the transmission loss at the light-blocking band of the fiber grating 6 to reach a predetermined value (for example, 40 dB), the greater the specific refraction differential Δ1, the shorter the time required. The effect of reducing the clad layer mode combination loss is proportional to the above-defined time. Accordingly, the inventors conclude that a single-peak optical fiber having a large specific refraction differential Δ1 can reduce the clad layer mode combination loss more effectively. With this single-peak optical fiber with a grating having a light-blocking wavelength band of, for example, 1640 nm to 1660 nm, the transmission loss at 1520 nm, which is inevitably caused in a conventional optical component, can be effectively reduced.

Thus, in this embodiment, a single-peak optical fiber 1 having a power-α distribution profile of the index of refraction, where α equals 0.5, is used, and a grating 6, whose light-blocking band is 1640 nm to 1660 nm, is formed in this optical fiber 1. The specific refraction differential Δ1 of the core 2, relative to pure silica (or the clad layer 5), is greater than 0.5% in order to efficiently reduce the transmission loss 1520 nm caused by the clad layer mode combination loss corresponding to the light-blocking band of 1640 nm to 1660 nm.

The grating 6 is formed by the first irradiation of ultraviolet beams through a phase mask 13 and the subsequent second irradiation of ultraviolet beams without the phase mask 13. This arrangement can effectively reduce the clad layer mode combination loss.

Figure 2A:
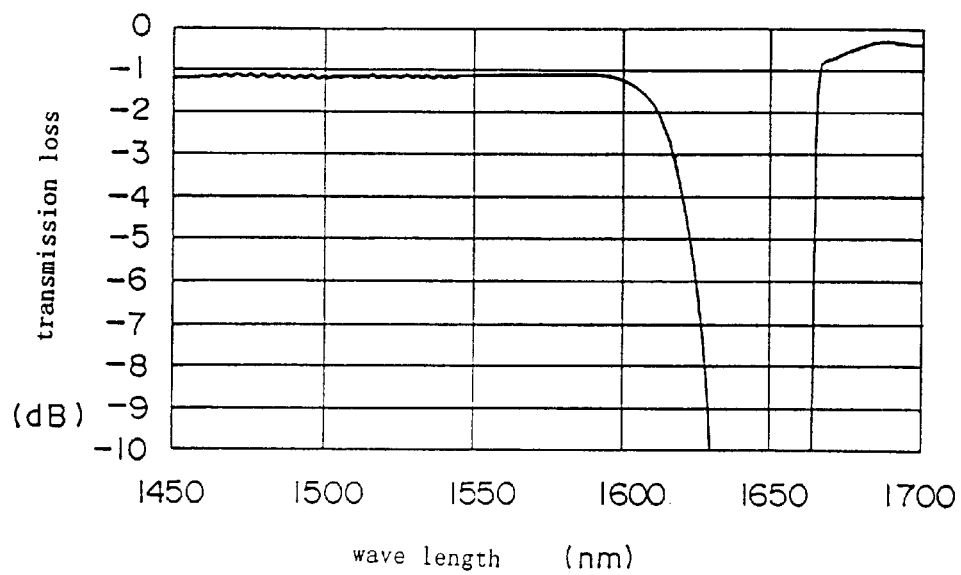
FIG. 2A is a graph showing the transmission loss of the optical component of the first embodiment as a function of wavelength.
Figure 2B:
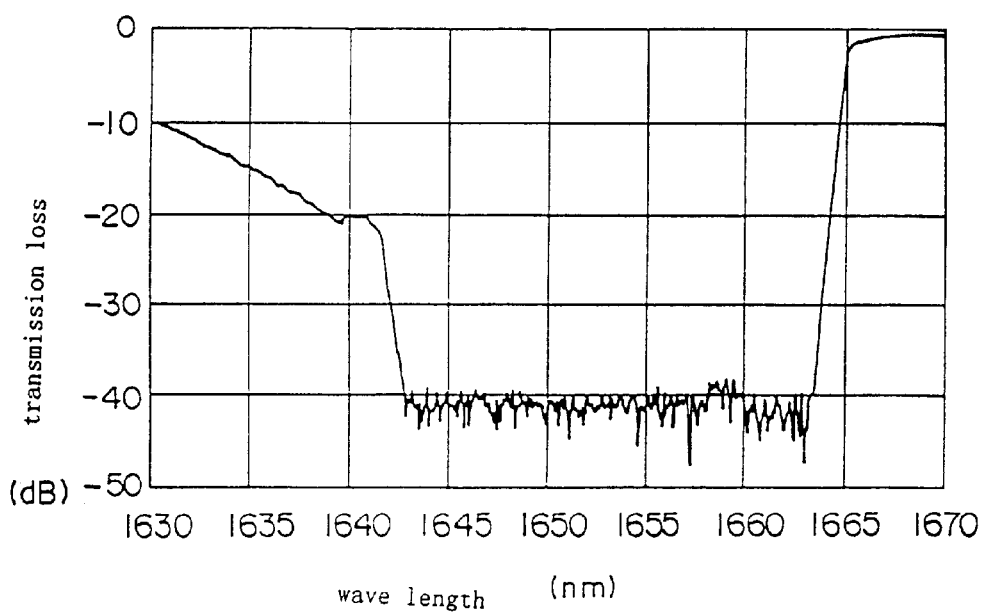
FIG. 2 is an enlarged view of FIG. 2A focusing on the range near 1650 nm.
Figure 7A:
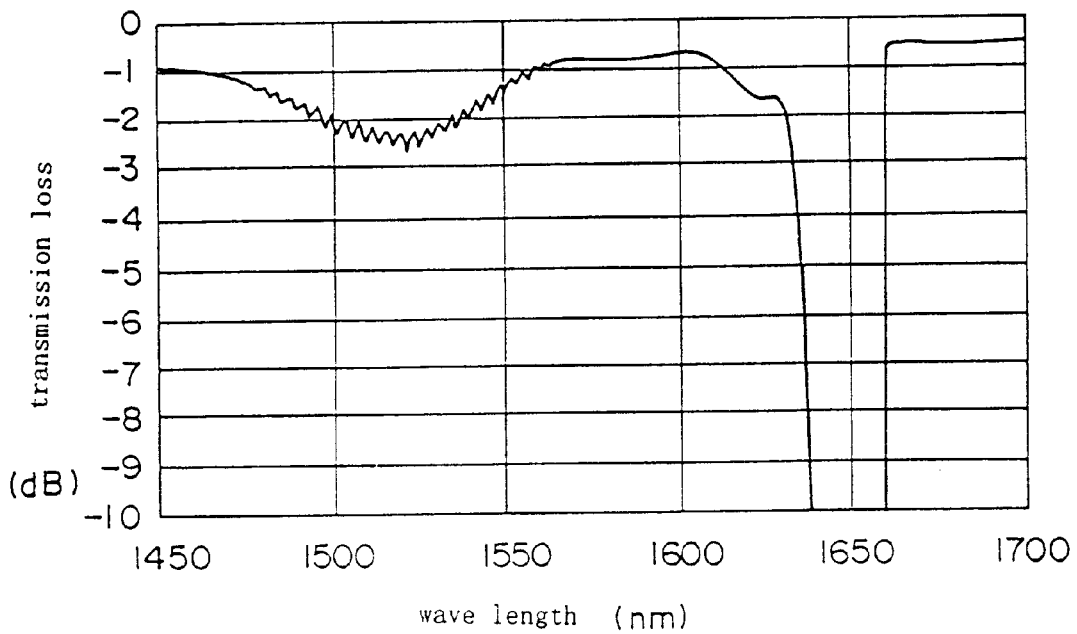
FIG. 7A is a graph showing the transmission loss of a conventional optical component, in which fiber gratings are formed in a single-mode optical fiber, as a function of wavelength.
Figure 7B:
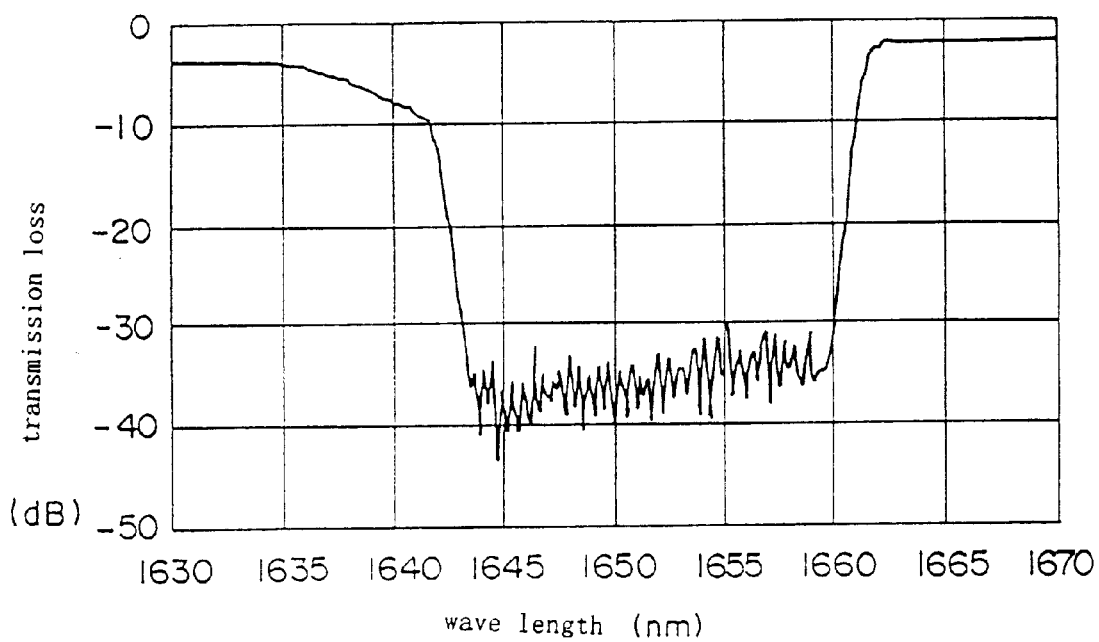
FIG. 7B is an enlarged view of FIG. 7A focusing on the range near 1650 nm.

FIG. 2A illustrates the light transmission loss of the grating-type optical component according to the first embodiment as a function of wavelength in the range from 1450 nm to 1700 nm, and FIG. 2B is an enlarged view focusing on the range from 1630 nm to 1670 nm. For purposes of comparison, FIG. 7A illustrates the light transmission loss of a conventional grating-type optical component using a single-mode optical fiber (having the distribution profile indicated by the solid line "a" in FIG. 6) as a function of wavelength in the range from 1450 nm to 1700 nm, and FIG. 7B is an enlarged view focusing on the range from 1630 nm to 1670 nm.

As is clear from these figures, the transmission loss at 1520 nm, which inevitably arises due to the clad layer mode combination loss in the conventional grating-type optical component, is eliminated by the grating-type optical component of the first embodiment of the present invention. In addition, the transmission loss in the light-blocking band of 1640 nm to 1660 nm is sufficient and stable, as compared with the conventional grating-type optical component. Thus, it is confirmed that the grating-type optical component of the first embodiment has a high-isolation property capable of reflecting the light component of this wavelength band.

Because the transmission loss at 1520 nm due to the clad-mode combination loss, which occurs corresponding to the prescribed light-blocking band of 1640 nm to 1660 nm, is reduced, wavelength multiplex transmission at the 1550 nm transmission band is reliably performed without causing intensity drop of the signal light, while the light component of the light-blocking wavelength band is accurately extracted or reflected. If this grating-type optical component is applied to a wavelength multiplex transmission system using, for example, erbium-added fibers with a transmission band of 1550 nm, monitoring light having a wavelength of 1640 nm to 1660 nm is reliably extracted without intensity drop of the signal light.

Figure 5:
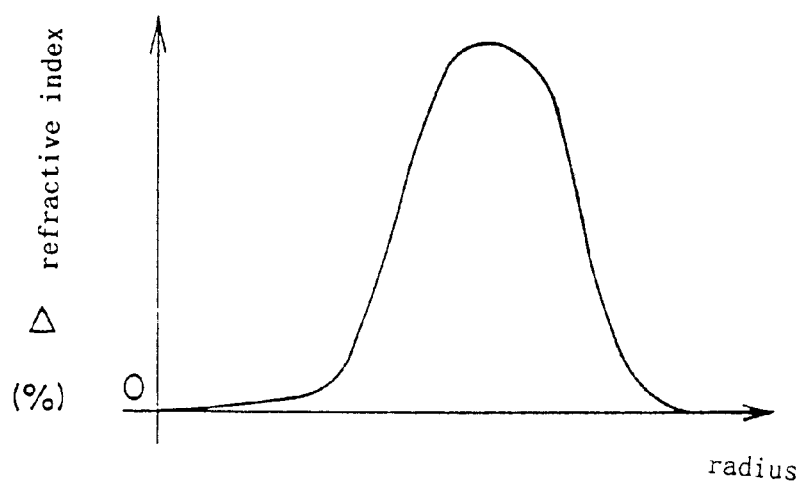
FIG. 5 illustrates the distribution profile of the index of refraction of a modification of the grating-type optical component of the present invention.

There are many changes and modifications of the first embodiment. For example, the α value of the single-peak optical fiber 1 is not limited to 0.5. If α is greater than 1.5 (α>1.5), the distribution profile of the index of refraction of the fiber becomes the one shown in FIG. 5. However, it is preferable to set α smaller than 1.5 because the clad layer mode combination loss can be efficiently reduced.

Although, in the first embodiment, the specific refraction differential Δ1 of the core relative to pure silica is set greater than 0.5%, it may be slightly smaller than 0.5%. However, it is again preferable to set the specific refraction differential Δ1 greater than 0.5% because the fiber can exhibit the effect of reducing the clad layer mode combination loss.

In the first embodiment, ultraviolet irradiation is performed twice, first irradiation through the phase mask, and the second irradiation without the mask, during the formation of the grating 6. However, the grating may be formed by a single irradiation as in the conventional phase mask method, or it may be formed by holography.

The light-blocking band of the grating 6 is not limited to the range from 1640 nm to 1660 nm and 1550 nm, and the transmission band of the optical fiber is not limited to 1550 nm. These values can be set appropriately depending on the use and purpose.

In this embodiment, the core 2 is made of silica in which germanium is doped, and the clad layer 5 is made of pure silica. However, the materials of the core 2 and the clad layer 5 are not limited to these examples. For example, phosphorus (P) or aluminum (Al) may be doped in silica as the material of the core 2. In this case, the index of refraction of the dopant is further increased by ultraviolet irradiation during the grating formation.

Figure 8A:
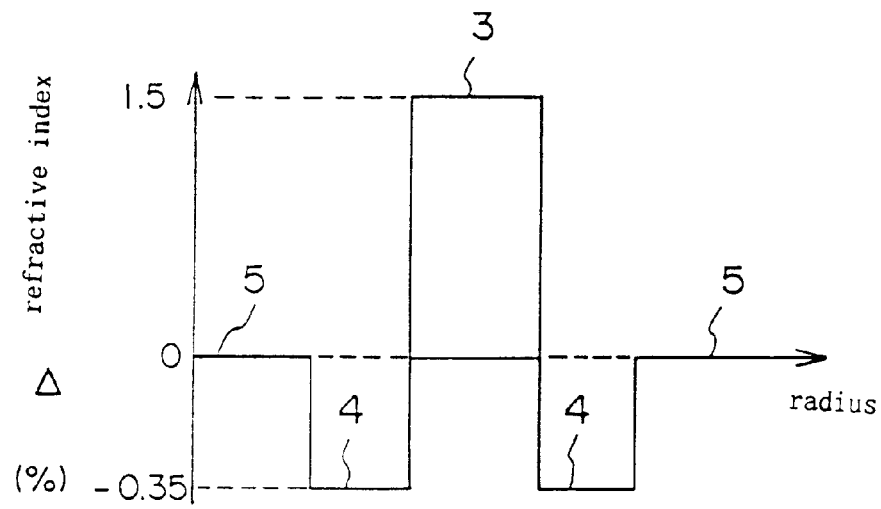
FIG. 8A illustrates the distribution profile of the index of refraction of a grating-type optical component according to the second embodiment of the present invention.
Figure 8B:
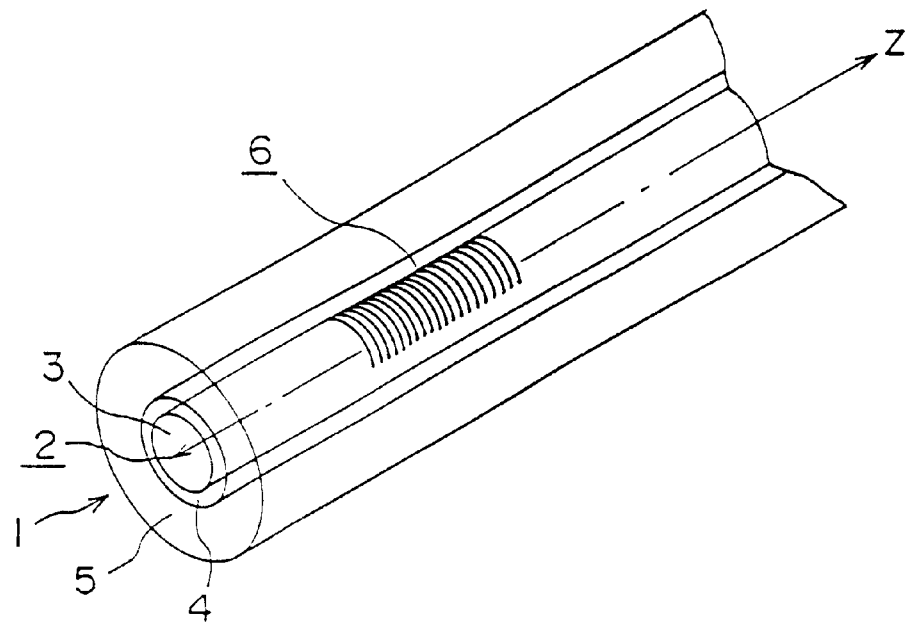
FIG. 8B illustrates the major part of the grating-type optical component.

FIG. 8 illustrates the grating-type optical component according to the second embodiment, where FIG. 8A shows the specific refraction of the optical fiber in the radial direction, and FIG. 8B is a perspective view of this grating-type optical component.

The grating-type optical component of the second embodiment comprises a W-type optical fiber 1 having a center core 3, a side core 4 surrounding the center core 3, and a clad layer 5 surrounding the side core 4. If the specific refraction differentials of the center core 3, the side core 4, and the clad layer 5, relative to pure silica, are Δ1, Δ2, and Δ3, respectively, the distribution profile of the index of refraction of this W-type optical fiber 1 satisfies the equation, as follows: Δ1>Δ3>Δ2. A grating 6 is formed on this W-type optical fiber such that the index of refraction of the center core 3 varies periodically with respect to the optical axis Z of the optical fiber 1. In this embodiment, the specific refraction differential same as follows; Δ1=1.5%; Δ2=-0.35%; and Δ3=0%.

Assuming that the index of refractions of the center core 3, the side core 4, and pure silica are $n_{CC}$, $n_S$, and $n_0$, respectively, the specific refraction differential Δ1, of the center core 3, relative to pure silica, is expressed by equation (3).

$$\Delta 1 = 100*[(n_{CC}^2 - n_0^2)/2n_{CC}^2] \quad (3)$$

The specific refraction differential Δ2 of the side core 4 relative to pure silica is expressed by equation (4).

$$\Delta 2 = 100*[(n_s^2 - n_0^2)/2n_s^2] \quad (4)$$

In the second embodiment, the clad layer 5 is made of pure silica ($SiO_2$). The center core 3 is made of silica in which germanium is doped, and the side core 4 is made of silica in which fluorine is doped. The absolute value of the specific refraction differential Δ1 (that is, 1.5 in this embodiment) of the center core 3 relative to pure silica is greater than the absolute value of the specific refraction differential Δ2 (that is, 0.35 in this embodiment) of the side core 4 relative to pure silica.

In this embodiment, the light-blocking band of the grating 6 is set to 1640 nm to 1660 nm, and the transmission band of the optical fiber 1 is set to 1550 nm, as in the first embodiment. The fiber grating 6 is formed by two-step irradiation of ultraviolet beams, the first irradiation through a phase mask, and the second irradiation without the mask.

The grating-type optical component of the second embodiment is manufactured in a similar manner to the first embodiment. First, the outermost protection layer (not shown) is stripped off of a predetermined length so that a part of the optical fiber 1 is exposed to the atmosphere. The exposed portion of the optical fiber 1 is subjected to pressurized hydrogen treatment for the purpose of improving the optical inductive property. Then, as shown in FIG. 11, ultraviolet laser beams L are emitted through the phase mask 13, whereby the index of refraction of the germanium, doped in the center core 3, is increased. Then, the phase mask 13 is removed, and the optical fiber 1 is again exposed to the ultraviolet laser beams L in order to further increase the index of refraction of the germanium in the center core 3. Thus, the fiber grating is completed.

The laser source is, for example, an excimer laser having a wavelength of 248 nm and an output of 350 mJ. Irradiation time is from several minutes to several tens of minutes. The mask pitch of the phase mask 13 is preferably 1138 μm, the zero-order diffraction light transmissivity of the mask 13 is preferably 1%, and the 1st-order diffraction light transmissivity of the mask 13 is preferably 40%. These conditions allow the grating to be formed precisely.

Since the clad layer mode combination loss in the optical fiber 1 is caused by the combination of the propagation mode, in which light tends to propagate through the core confining itself in the core, and the reflection mode, in which the light reflected by the grating oozes into the clad layer, the inventors proposed to decrease the propagation mode in order to reduce the clad layer mode combination loss.

In order to effectively reduce the propagation mode, the W-type optical fiber 1 is used in this embodiment, because, in the W-type optical fiber 1, the specific refraction differential Δ2 of the side core 4 relative to pure silica is smaller than the specific refraction differential Δ3 of the clad layer 5 relative to pure silica, which can allow the propagation mode, in which light tends to propagate through the core confining itself, to decrease.

In order to specify the optimal conditions, various W-type optical fibers 1 with different values of specific refraction differentials Δ1 and Δ2 of the center core 3 and the side core 4 relative to pure silica were prepared. The light-blocking wavelength bands of the gratings formed in these optical fibers 1 are all set to 1640 nm to 1660 nm. Then, the relationship between the transmission loss and the wavelength was observed.

From the measurement result, it was confirmed that the W-type optical fiber 1 with the grating 6 can reduce the transmission loss at 1520 nm, which occurs in the conventional single-mode optical fiber, regardless of the values of the specific refraction differentials Δ1 and Δ2. Because, in the W-type optical component, the absolute value of the specific refraction differential Δ1 is set greater than the absolute value of the specific refraction differential Δ2, the clad layer mode combination loss can be reduced at a high reproducibility, while the light-propagation property of the optical fiber 1 is maintained excellent.

Figure 10:
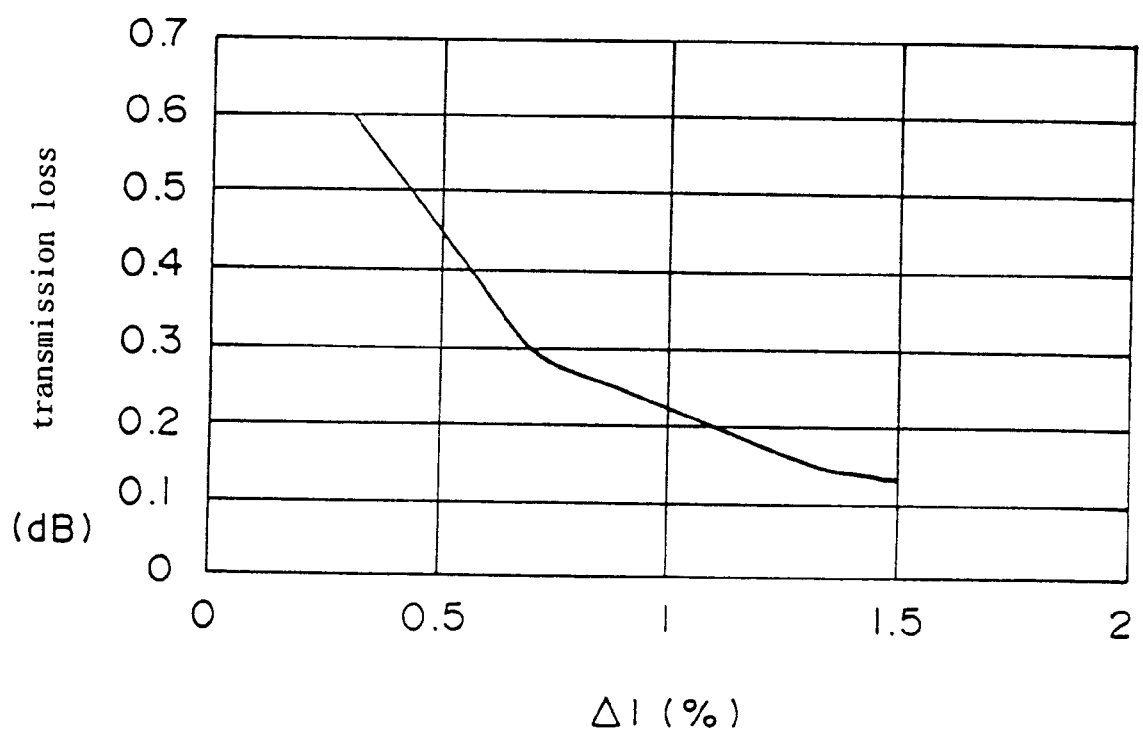
FIG. 10 is a graph showing the transmission loss of a W-type optical fiber as a function of the specific refraction differential Δ1 of the center core relative to pure silica.

In addition, various W-type optical fibers 1 with different Δ1 values of the center core 3, all of which have gratings whose light-blocking wavelength band is 1640 nm to 1660 nm, were prepared in order to measure the transmission loss at the 1550 nm transmission band and observe the effect of reducing the clad layer mode combination loss. The measurement result is shown in FIG. 10. As is clear from this figure, if the specific refraction differential Δ1 exceeds 0.5%, the transmission loss decreases. If the Δ1 value exceeds 0.8%, the transmission loss further decreases. Above 1.2%, the transmission loss still decreases gently, which allows the clad layer mode combination loss to be reduced. Based on this observation result, in the second embodiment, the specific refraction differential Δ1 of the center core 3, relative to pure silica, is set to 1.5%, which is greater than 0.5%.

As to the relationship between the specific refraction differential Δ1 and time required for the transmission loss at the light-blocking band of the fiber grating 6 to reach a predetermined value (for example, 40 dB), the greater the specific refraction differential Δ1, the shorter the time required. The effect of reducing the clad layer mode combination loss is proportional to the above-defined time. Accordingly, the inventors conclude that a W-type optical fiber having a large specific refraction differential Δ1 can reduce the clad layer mode combination loss more effectively. With the W-type optical fiber with a grating having a light-blocking wavelength band of, for example, 1640 nm to 1660 nm, the transmission loss arising at 1520 nm can be effectively reduced.

Thus, in this embodiment, a W-type optical fiber 1 with the Δ1 and Δ2 values set to 1.5% and −0.35%, respectively, is used, and a grating 6 having a light-blocking band of 1640 nm to 1660 nm is formed in this optical fiber 1. This grating-type optical component can effectively reduce the transmission loss at 1520 nm.

The grating 6 is formed by the first irradiation of ultraviolet beams through a phase mask 13 and the subsequent second irradiation of ultraviolet beams without the phase mask 13. This arrangement can effectively reduce the clad-mode combination loss.

Figure 9A:
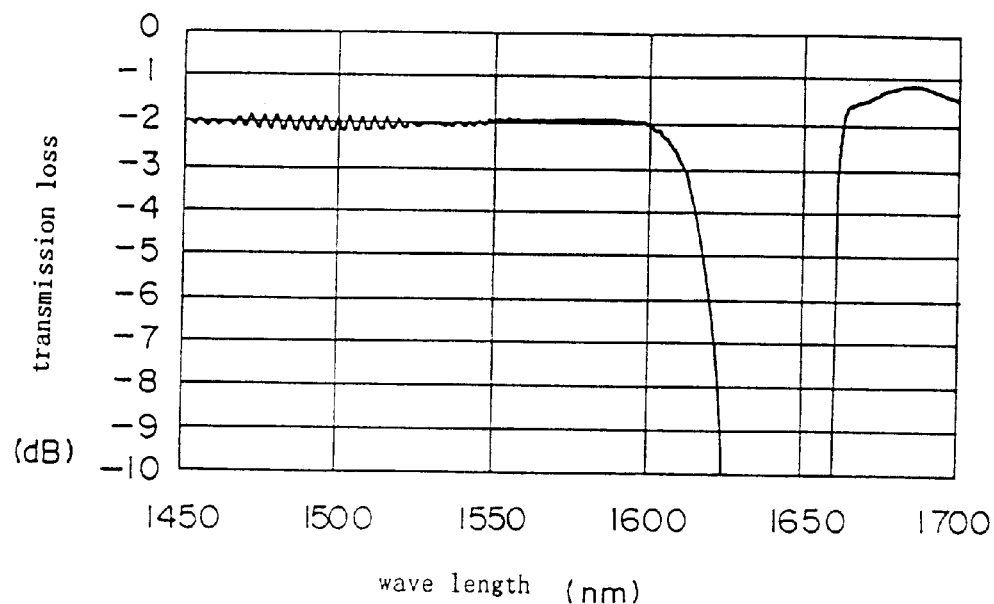
FIG. 9A is a graph showing the transmission loss of the optical component of the second embodiment as a function of wavelength.
Figure 9B:
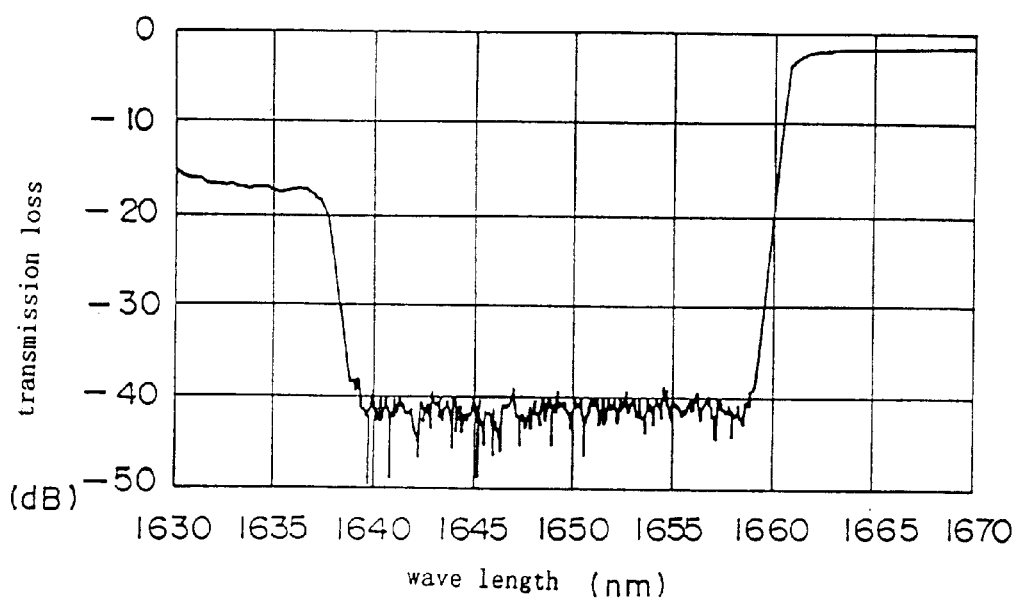
FIG. 9B is an enlarged view of FIG. 9A focusing on the range near 1650 nm.

FIG. 9A illustrates the light transmission loss of the grating-type optical component of the second embodiment as a function of wavelength in the range from 1450 nm to 1700 nm, and FIG. 9B is an enlarged view of FIG. 9A focusing on the range from 1630 nm to 1670 nm. For purposes of comparison, FIG. 7A illustrates the light transmission loss of a conventional grating-type optical component using a single-mode optical fiber as a function of wavelength in the range from 1450 nm to 1700 nm, and FIG. 7B is a enlarged view focusing on the range from 1630 nm to 1670 nm.

As is clear from these figures, the transmission loss at 1520 nm, which inevitably arises in the conventional grating-type optical component due to the clad layer mode combination loss, is eliminated by the grating-type optical component of the second embodiment of the present invention. In addition, the transmission loss in the light-blocking band of 1640 nm to 1660 nm is sufficient and stable, as compared with the conventional grating-type optical component. Thus, it is confirmed that the grating-type optical component of the second embodiment has a high-isolation property capable of reliably reflecting the light component of this wavelength band.

Because the transmission loss at 1520 nm due to the clad layer mode combination loss, which occurs corresponding to the prescribed light-blocking band of 1640 nm to 1660 nm, is reduced, wavelength multiplex transmission at the 1550 nm transmission band is reliably performed without intensity drop of the signal light, while the light component of the light-blocking wavelength band is accurately extracted or reflected. If this grating-type optical component is applied to a wavelength multiplex transmission system using, for example, erbium-added fibers with a transmission band of 1550 nm, monitoring light having a wavelength of 1640 nm to 1660 nm is reliably extracted without intensity drop of the signal light.

There are many changes and modifications of the second embodiment. For example, although, in the second embodiment, the specific refraction differential Δ1 of the center core 3 relative to pure silica is set to 1.5%, it may be appropriately set as long as it exceeds 0.5%. The upper limit of the specific refraction Δ1 is the maximum value which can be achieved by the current technology, that is, about 2.8%; however, it may be set higher as the technology progresses.

In the second embodiment, the specific refraction differential Δ2 of the side core 4, relative to pure silica, is set to −0.35%; however, it may be appropriately set as long as the absolute value of Δ1 is greater than the absolute value of Δ2.

In the second embodiment, ultraviolet irradiation is performed twice, first irradiation through the phase mask, and the second irradiation without the mask, during the formation of the grating 6. However, the grating 6 may be formed by a single irradiation as in the conventional phase mask method, or it may be formed by holography.

The light-blocking band of the grating 6 is not limited to the range from 1640 nm to 1660 nm and 1550 nm, and the transmission band of the optical fiber is not limited to 1550 nm. These values can be set appropriately depending on the use and purpose.

In this embodiment, the center core 3 is made of silica in which germanium is doped, the side core 4 is made of silica in which fluorine is doped, and the clad layer 5 is made of pure silica. However, the materials of the center core 3, the side core 4, and the clad 5 are not limited to these examples. For example, phosphorus (P) or aluminum (Al) may be doped in silica as the material of the center core 3. In this case, the index of refraction of the dopant is further increased by ultraviolet irradiation during the grating formation.

Figure 12A:
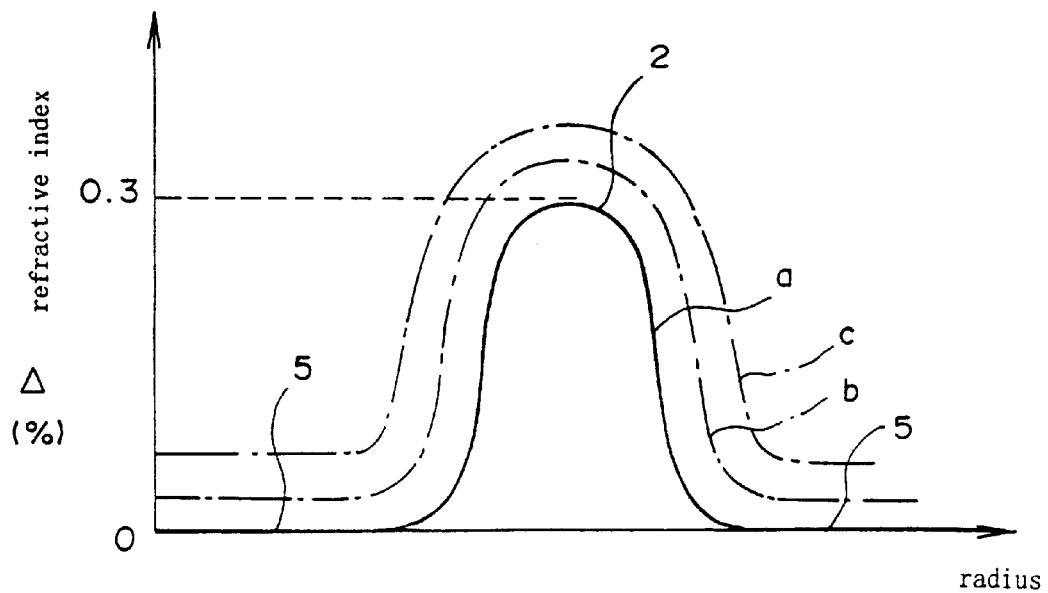
FIG. 12A illustrates the distribution profile of the index of refraction of a grating-type optical component according to the third embodiment of the present invention.
Figure 12B:
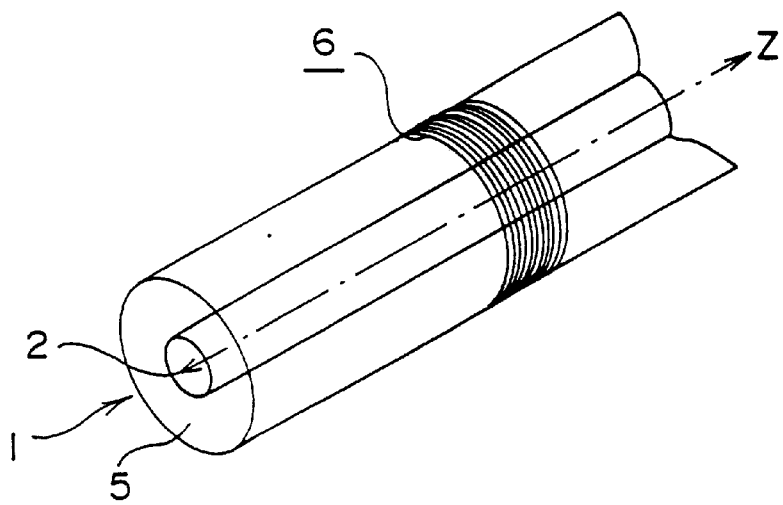
FIG. 12B illustrates the major part of the grating-type optical component.

FIG. 12 illustrates the grating-type optical component according to the third embodiment, where FIG. 12A shows the specific refraction of the optical fiber in the radial direction, and FIG. 12B is a perspective view of this grating-type optical component.

The grating-type optical component of the third embodiment comprises a co-doped optical fiber 1 having a core 2, in which germanium is doped as a dopant for increasing the index of refraction of the core 2, and a clad layer 5, in which both germanium, as a dopant for increasing the index of refraction, and fluorine (F), as a dopant for decreasing the index of refraction, are doped. By doping both germanium and fluorine in the clad layer 5, the index of refraction of the clad layer 5 is substantially equal to that of pure silica. A grating 6 is formed on this co-doped optical fiber 1 such that the indexes of refraction of both the core 2 and the clad layer 5 vary periodically with respect to the optical axis Z of the optical fiber 1.

In the third embodiment, the specific refraction differential Δ1 of the core 2 relative to pure silica is set equal to or greater than 0.3% (Δ1=0.3% in the example shown in FIG. 12), and the upper limit of Δ1 is the maximum value which can be achieved by the current technology, that is, about 0.8%. The upper limit may be set higher as the technology progresses.

The light-blocking band of the grating 6 is set to 1640 nm to 1660 nm, and the transmission band of the optical fiber 1 is set to 1550 nm. The fiber grating 6 is formed by two-step irradiation of ultraviolet beams, the first irradiation through a phase mask, and the second irradiation without the mask, as in the first and second embodiments.

Because a large clad layer mode combination loss and, therefore, a transmission loss occurred at and near 1520 nm in the conventional grating-type optical component whose light-blocking band is 1640 nm to 1660 nm using a single-mode optical fiber having a rectangular distribution profile of index of refraction indicated by the solid line "a" in FIG. 6, due to the large gap between the abrupt change of the index of refraction at the core-clad layer boundary and the gentle change of propagation mode in the radial direction, the inventors propose to reduce the gap between the change of the index of refraction and the change of the propagation mode at the core-clad layer mode boundary in order to decrease the clad layer mode combination loss.

The grating-type optical component of the third embodiment uses a co-doped optical fiber 1 having a distribution profile of index of refraction indicated by the solid line "a" in FIG. 12A. Because germanium is doped in both the core 2 and the clad layer 5 in this co-doped optical fiber 1, if the optical fiber is irradiated by ultraviolet beams during the formation of the grating 6, the indexes of refraction of both the core 2 and the clad layer 5 are increased because of the dopant (i.e., germanium) as shown by the dotted broken lines b and c in FIG. 12A. Consequently, the index of refraction changes gently at the core-clad layer boundary, as compared with the conventional single-mode optical fiber.

In order to specify the optimal conditions, various co-doped optical fibers 1 with different Δ1 values were prepared. The light-blocking wavelength bands of the gratings formed in these optical fibers 1 are all set to range from 1640 nm to 1660 nm, and the relationship between the transmission loss and the wavelength was observed. From the measurement result, it was confirmed that the co-doped optical fiber 1 with the grating 6 can reduce the transmission loss at 1520 nm which inevitably occurs in the conventional single-mode optical fiber, regardless of the values of the specific refraction differential Δ1. In particular, the transmission loss is effectively reduced if Δ1 is greater than 0.3%. This effect can be exhibited at a high reproducibility.

As to the relationship between the specific refraction differential Δ1 and time required for the transmission loss at the light-blocking band of the fiber grating 6 to reach a predetermined value (for example, 40 dB), the greater the specific refraction differential Δ1, the shorter the time required. The effect of reducing the clad layer mode combination loss is proportional to the above-defined time. Accordingly, the inventors conclude that a co-doped optical fiber having a large specific refraction differential Δ1 can reduce the clad layer mode combination loss more effectively. With the light-blocking wavelength band of 1640 nm to 1660 nm, the transmission loss at 1520 nm can be effectively reduced.

Thus, in this embodiment, a co-doped optical fiber 1 with the Δ1 value (i.e., the specific refraction differential of the core 2 relative to the clad layer 5 or pure silica) set equal to or greater than 0.3% is used, and a grating 6, having a light-blocking band of 1640 nm to 1660 nm, is formed in this optical fiber 1. This grating-type optical component can effectively reduce the transmission loss at 1520 nm.

The grating 6 is formed by the first irradiation of ultraviolet beams through a phase mask 13 and the subsequent second irradiation of ultraviolet beams without the phase mask 13. This arrangement can effectively reduce the clad layer mode combination loss.

Figure 13A:
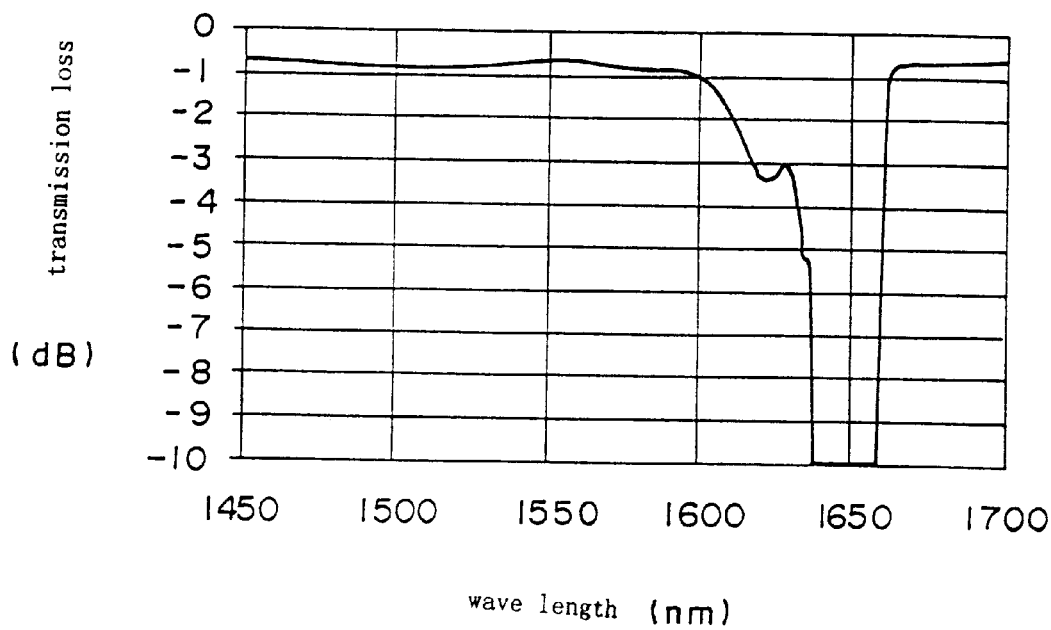
FIG. 13A is a graph showing the transmission loss of the optical component of the third embodiment as a function of wavelength.
Figure 13B:
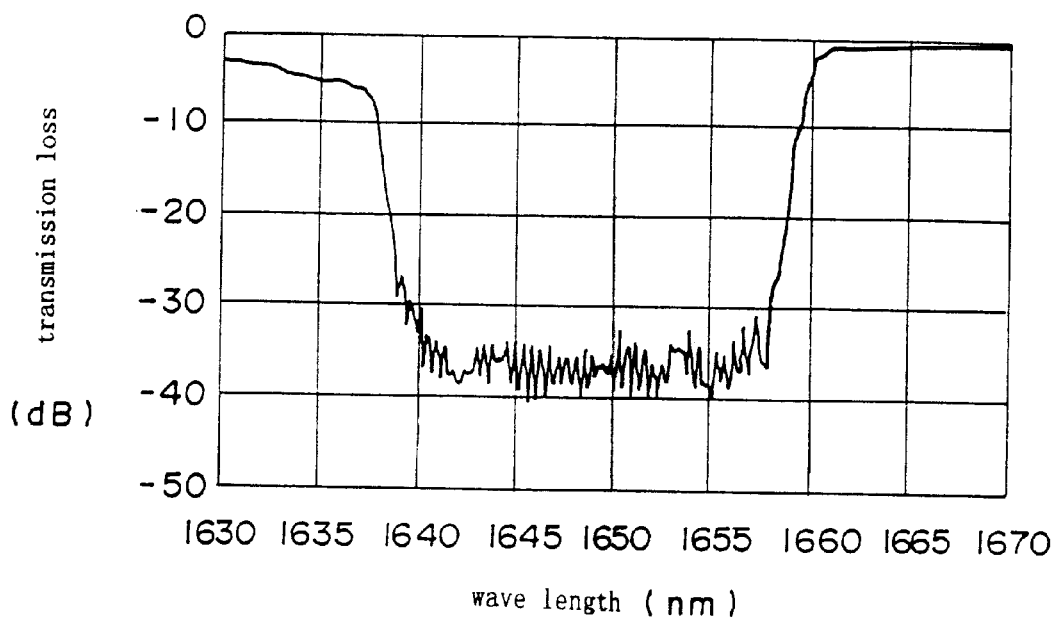
FIG. 13B is an enlarged view of FIG. 13A focusing on the range near 1650 nm.

FIG. 13A illustrates the light transmission loss of the grating-type optical component of the third embodiment as a function of wavelength in the range from 1450 nm to 1700 nm, and FIG. 13B is a enlarged view of FIG. 13A focusing on the range from 1630 nm to 1670 nm. For purposes of comparison, FIG. 7A illustrates the light transmission loss of a conventional grating type optical component using a single-mode optical fiber as a function of wavelength in the range from 1450 nm to 1700 nm, and FIG. 7B is a enlarged view focusing on the range from 1630 nm to 1670 nm.

As is clear from these figures, the transmission loss at 1520 nm, which inevitably arises in the conventional grating-type optical component due to the clad layer mode combination loss, is eliminated by the grating-type optical component of the third embodiment of the invention. In addition, the transmission loss in the light-blocking band of 1640 nm to 1660 nm of this embodiment is almost the same as in the conventional grating-type optical component. Thus, it is confirmed that the grating-type optical component of the third embodiment has a high-isolation property capable of reliably reflecting the light component of this wavelength band.

Because the transmission loss at 1520 nm due to the clad layer mode combination loss, which corresponds to the prescribed light-blocking band of 1640 nm to 1660 nm, is reduced, wavelength multiplex transmission at the 1550 nm transmission band is reliably performed without intensity drop of the signal light, while the light component of the light-blocking wavelength band is accurately extracted or reflected. If this grating-type optical component is applied to a wavelength multiplex transmission system using, for example, erbium-added fibers with a transmission band of 1550 nm, monitoring light having a wavelength of 1640 nm to 1660 nm is reliably extracted without intensity drop of the signal light.

There are many changes and modifications of the third embodiment. For example, although, in the third embodiment, the specific refraction differential Δ1, of the core 2, of the co-doped optical fiber 1, relative to pure silica, is set equal to or greater than 0.3%, it may be appropriately set. However, by setting the specific refraction differential Δ1 greater than 0.3%, the clad layer mode combination loss can be efficiently reduced.

In the third embodiment, ultraviolet irradiation is performed twice, first irradiation through the phase mask, and the second irradiation without the mask, during the formation of the grating 6. However, the grating 6 may be formed by a single irradiation as in the conventional phase mask method, or it may be formed by holography.

In this embodiment, the core 2 is made of silica in which germanium is doped, and the clad layer 5 is made of silica in which germanium and fluorine are doped. However, the materials of the core 2 and the clad layer 5 are not limited to these examples. For example, phosphorus (P) or aluminum (Al) may be doped in silica as the material of the core 2. These dopants may be doped together with fluorine, which is capable of decreasing the index of refraction, in the clad layer 5 made of silica. The indexes of refraction of these dopants (phosphorus and aluminum) are further increased by ultraviolet irradiation during the grating formation.

The light-blocking band of the fiber grating 6 and the transmission band of the co-doped optical fiber 1 are not limited to 1640 nm to 1660 nm and 1550 nm, and they may be appropriately determined depending on the use and the purpose.

Figure 14:
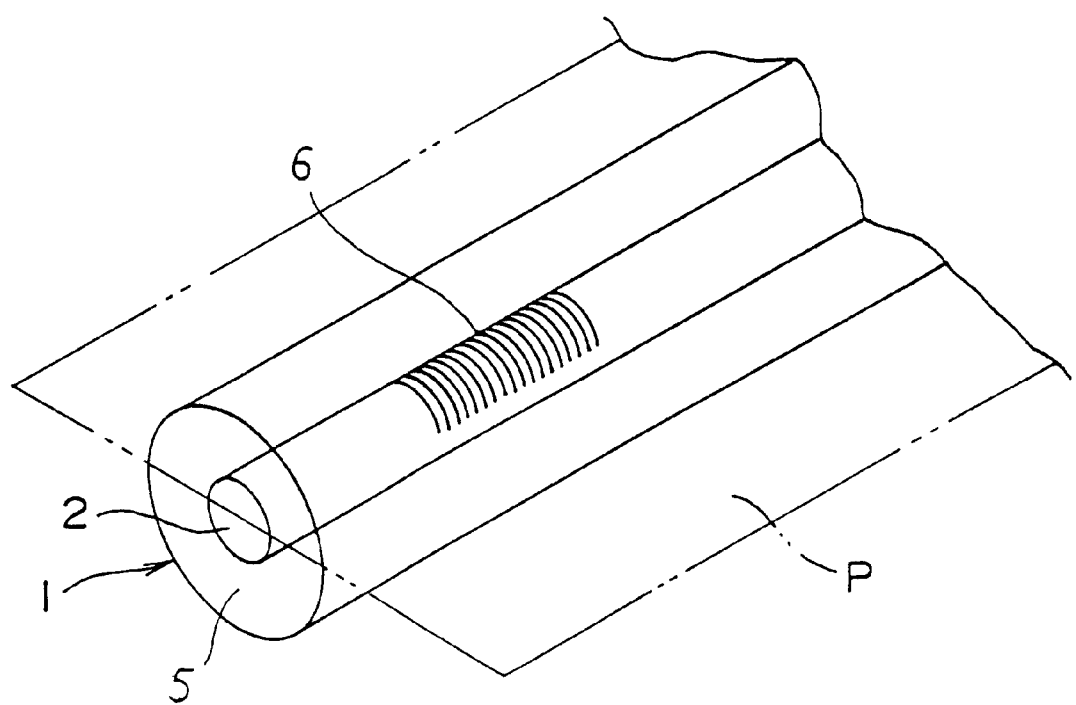
FIG. 14 is a perspective view showing how the grating-type optical component is manufactured according to the fourth embodiment of the present invention.

Next, several preferred methods for manufacturing the grating-type optical components according to the present invention will be explained. In the first method, a single-mode optical fiber 1 having a core 2 and a clad layer 5 is used. A predetermined length of grating 6 is formed on one side of the cylindrical surface of the core 2, as shown in FIG. 14, such that the index of refraction of the core 2 varies periodically along the optical axis of the core 2. In the example shown in FIG. 14, the grating 6 is formed on the upper half of the core 2 above a plane P including the core 2.

When manufacturing a grating-type optical component using the optical fiber 1, first of all, the outermost protection layer (not shown) is stripped off of a predetermined length so that a part of the optical fiber 1 is exposed to the atmosphere. The exposed portion of the optical fiber 1 is subjected to pressurized hydrogen treatment under a pressure of 200 atm at a normal temperature for three (3) to twenty (20) days for the purpose of improving the optical inductive property.

Then, as shown in FIG. 4, the optical fiber 1 is irradiated through a phase mask 13 by laser beams L from one side of a plane including the core 2 (FIG. 14) for several minutes to several tens of minutes. The laser beams L are emitted from an excimer laser source having a wavelength of 248 nm and output of 350 mJ. Thus, the optical fiber 1 is irradiated by diffraction light produced by the phase mask 13, whereby a grating 6 is formed on the core 2 such that the index of refraction varies periodically along the optical axis of the core 2.

The mask pitch of the phase mask 13 is 1138 μm, the zero-order diffraction light transmissivity of the mask 13 is 1%, and the 1st-order diffraction light transmissivity is 40%. Next, the entire surface of the optical fiber 1 is irradiated by the laser beams L from the other side of the plane P for several minutes to several tens of minutes without using the phase mask 13. By this two-step irradiation, a predetermined length of grating 6 is formed on one side of the core 2 above the plane P with the index of refraction periodically varied along the optical axis of the fiber 1.

Figure 15A:
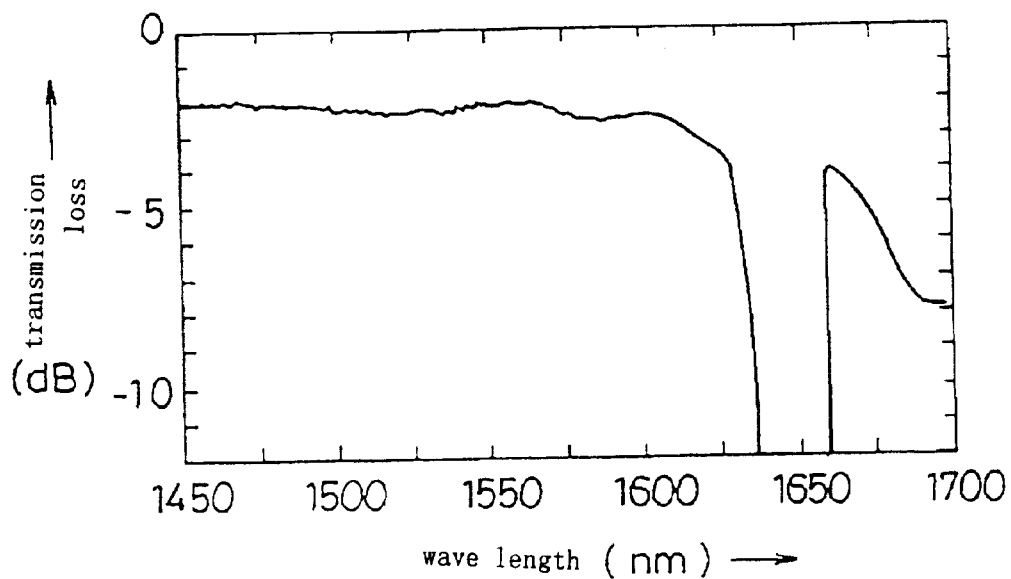

In order to check the quality of the grating-type optical component manufactured by this method, light emitted from a white light source is introduced into the optical component from one end, and the transmission loss (dB) of the light having propagated through the grating 6 is measured at the other end of the optical component by a spectrum analyzer. The measurement result is shown in FIG. 15A. For purposes of comparison, FIG. 15B shows the transmission loss (dB) of the light propagating through an optical fiber manufactured by a conventional method, in which a grating is formed by single irradiation of laser beams (or ultraviolet beams) only from one side of the fiber through a phase mask 13.

Figure 15B:
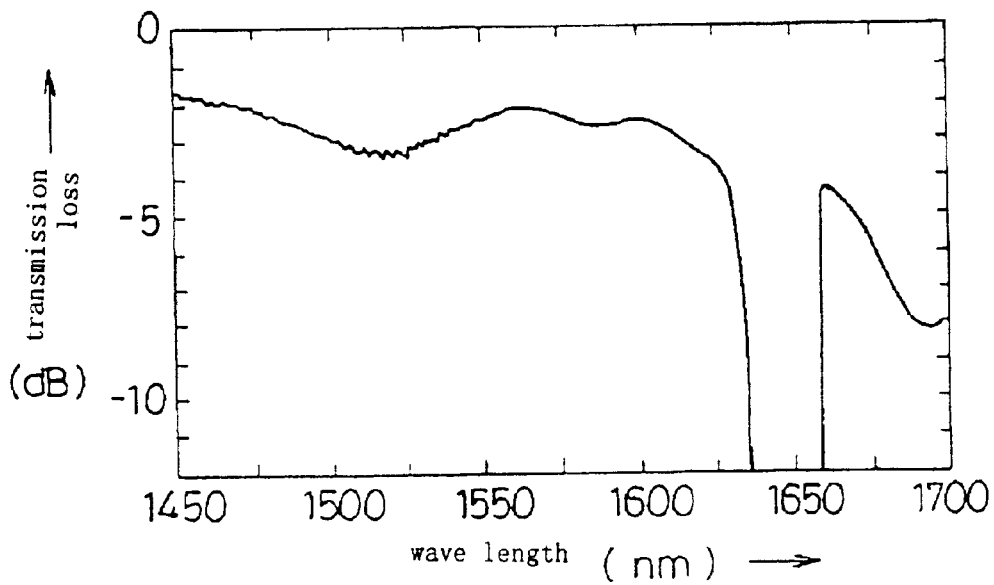
FIG. 15B is a spectrum diagram of a grating-type optical component manufactured by a conventional method.

As is clear from FIGS. 15A and 15B, the transmission loss at 1520 nm is substantially eliminated in the optical fiber 1 with a grating 6 manufactured by the method of the present invention. Thus, the method of the present invention can improve the spectral transmissivity of the grating-type optical component. Although, in this embodiment, an optical fiber is used as a waveguide, a plane waveguide optically formed on a transparent substrate may be used as long as it is irradiated by ultraviolet beams from both sides of the plane. The grating may be formed by holography, instead of the phase-mask method.

Figure 16:
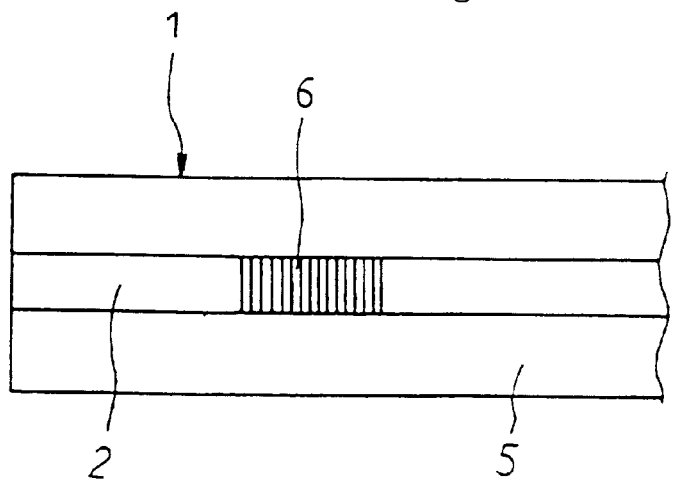
FIG. 16 is a front view of the grating-type optical component manufactured by the method of the fifth embodiment of the present invention.

FIGS. 16 through 20 illustrate the second method of manufacturing a grating-type optical component. In this method, an optical fiber 1 having a core 2 and a clad layer 5 is used, and a predetermined length of grating 6 is formed on the core 2 such that the index of refraction of the core 2 varies periodically along the optical axis of the core 2, as shown in FIG. 16.

Prior to forming a grating 6, an exposed portion of the optical fiber 1 is subjected to pressurized hydrogen treatment under a pressure of 200 atm at a normal temperature for three (3) to twenty (20) days for the purpose of improving the optical inductive property.

Figure 17:
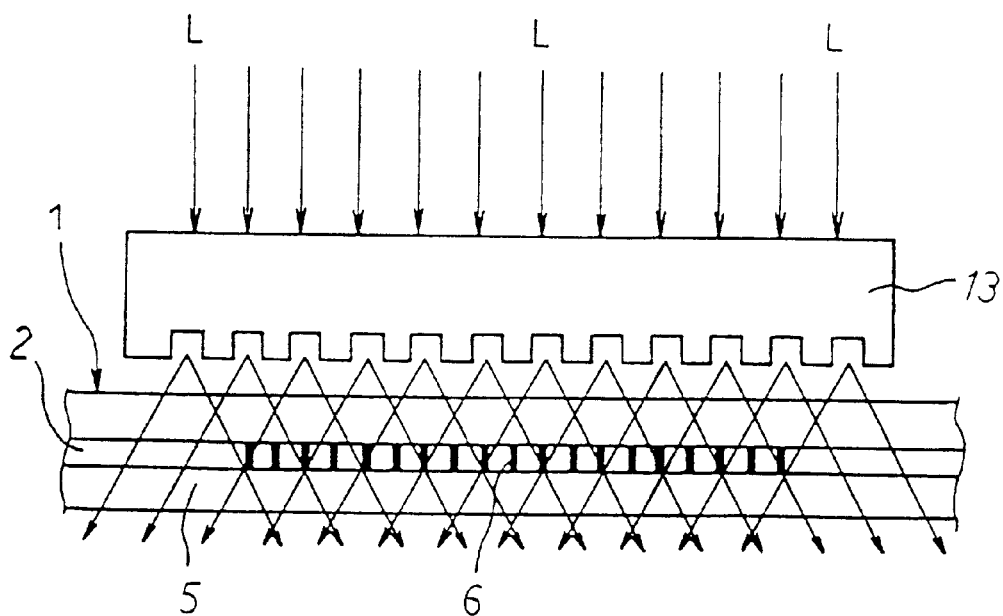
FIG. 17 is a side view showing a step of the manufacturing process of the grating-type optical component shown in FIG. 16.
Figure 18:
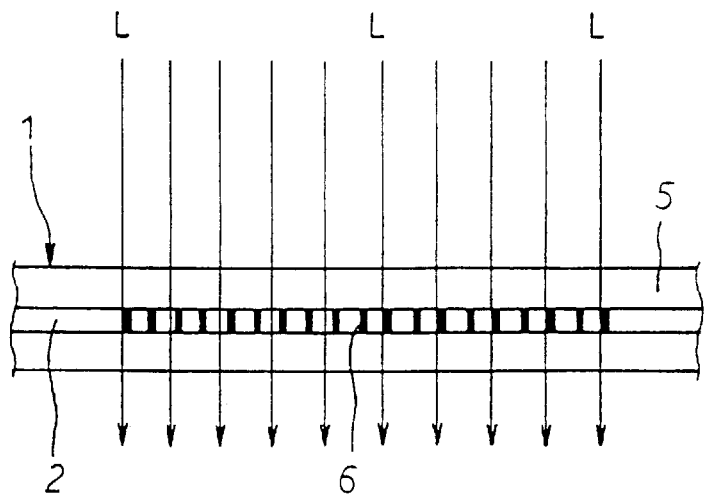
FIG. 18 is a side view showing another step of the manufacturing process of the grating type optical component shown in FIG. 16.

Then, as shown in FIG. 17, the optical fiber 1 is irradiated through a phase mask 13 by laser beams L emitted from an excimer laser source having a wavelength of 248 nm and output of 350 mJ for several minutes to several tens of minutes, whereby a grating 6 is formed on the core 2 such that the index of refraction varies periodically along the optical axis of the core 2.

The mask pitch of the phase mask 13 is 1138 μm, the zero-order diffraction light transmissivity of the mask 13 is 1%, and the first-order diffraction light transmissivity is 40%.

Next, the entire area in which the grating 6 is formed is irradiated uniformly by the laser beams L without using the phase mask 13 for several minutes to several tens of minutes.

Figure 19:
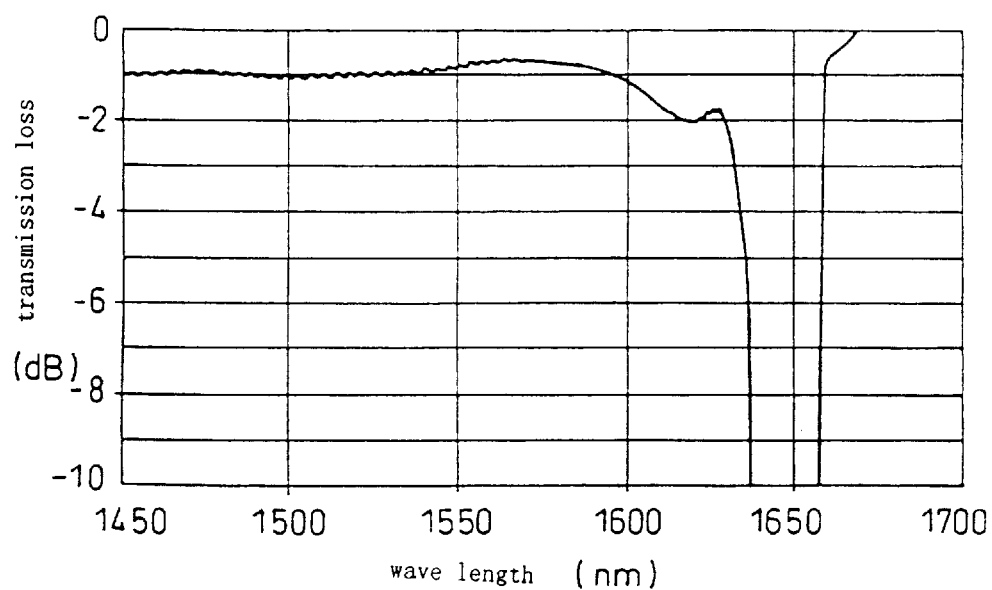
FIG. 19 is a graph showing the transmission loss of the optical component manufactured by the method according to the fifth embodiment of the present invention as a function of wavelength.

Again, the transmission loss (dB) of the light having propagated through the grating 6 is measured by introducing incident light from a white light source into the grating-type optical component from one end and measuring the transmission loss at the other end of the optical component by a spectrum analyzer. The measurement result is shown in FIG. 19.

The transmission loss L (dB) is defined by the following equation:

$$L = -\log_{10} P2/P1$$

where P2 is the power of the incident light to the optical fiber 1 from the white light source, and P1 is the power of the exit light output from the optical fiber 1 through the grating 6.

Figure 20:
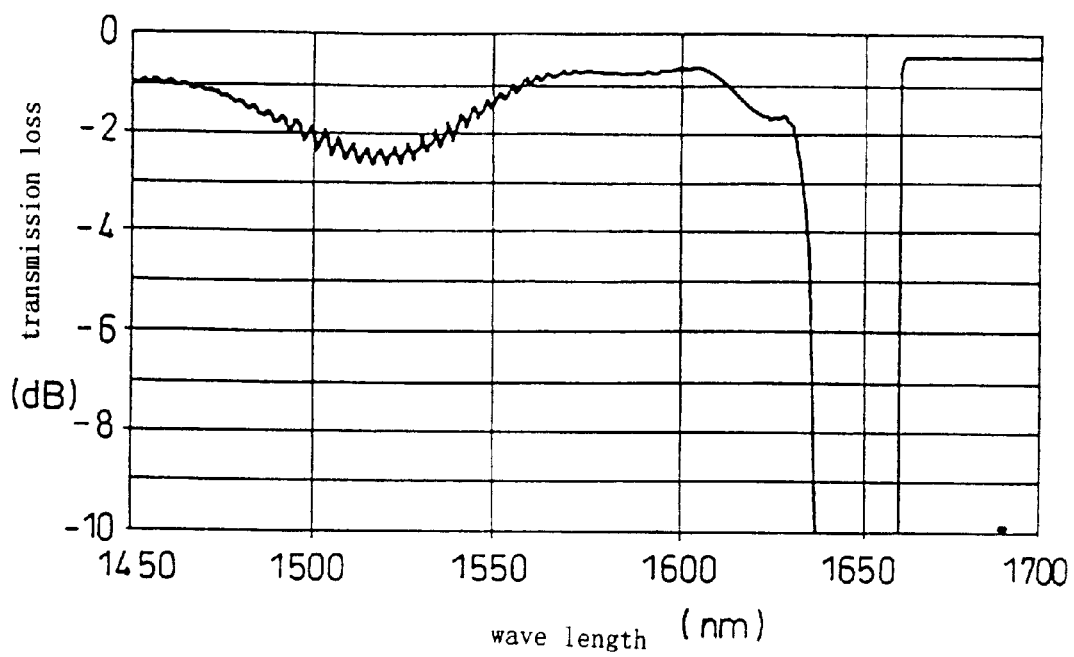
FIG. 20 is a graph showing the transmission loss of the optical component manufactured by a conventional method as a function of wavelength.

For purposes of comparison, FIG. 20 shows the transmission loss (dB) of an optical fiber manufactured by a conventional method performing single irradiation of laser beams (or ultraviolet beams).

As is clear from FIGS. 19 and 20, the transmission loss at 1520 nm is substantially eliminated in the optical fiber 1 with a grating 6 manufactured by the second method of the present invention. Thus, the spectral transmissivity of a grating-type optical component can be improved by this second method.

As in the first method, a plane waveguide optically formed on a transparent substrate may be used in place of the optical fiber, and the grating may be formed by holography instead of the phase-mask method.

Figure 24A:
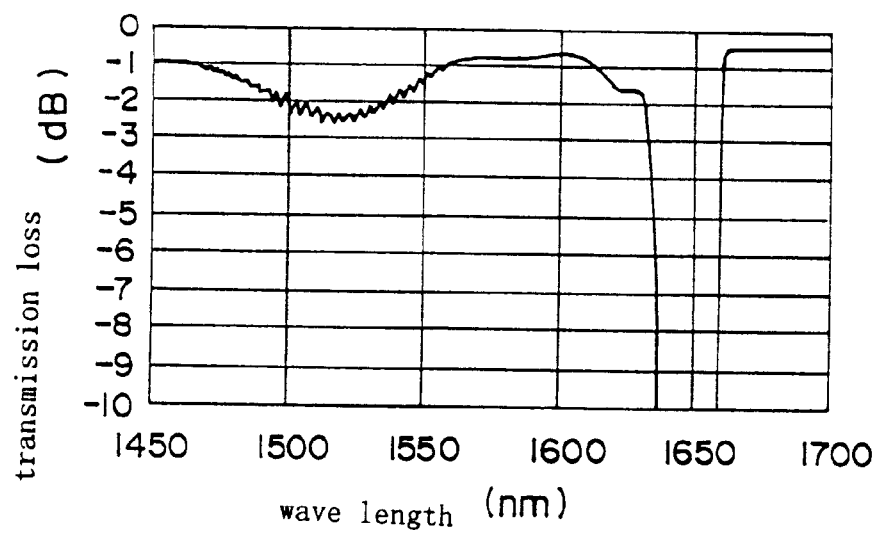
FIG. 24A is a graph showing the transmission loss of the optical component manufactured by a conventional method as a function of wavelength.
Figure 24B:
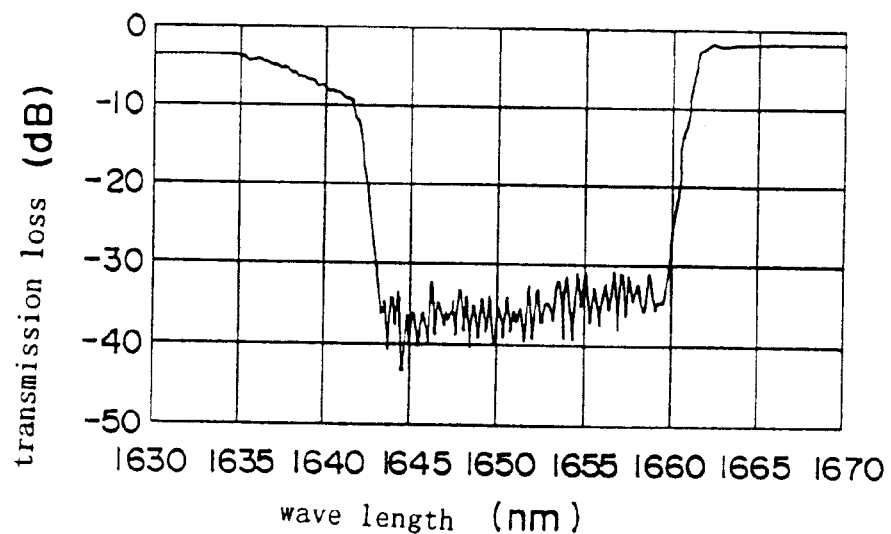
FIG. 24B is an enlarged view of FIG. 24A focusing on the range near 1650 nm.

Next, the third method of manufacturing a grating-type optical component will be described. As has been explained, if a grating is formed by continuous irradiation of ultraviolet beams, a clad layer mode combination loss occurs on the short wavelength side of the light-blocking band of the grating 6, as shown in FIG. 24A. The wavelength band of this clad layer mode combination loss depends on the wavelength of the light-blocking band. If the light-blocking band of the grating 6 is set to the range from 1645 nm to 1660 nm, which is shown clearer in FIG. 24B which is an enlarged view of FIG. 24A focusing on the light-blocking band, the clad layer mode combination loss occurs near the 1550 nm transmission band of the wavelength multiplex communication system and, as a result, the signal transmission ability of the system is deteriorated.

In order to overcome this problem, the inventors found that the clad layer mode combination loss can be effectively reduced by two-step irradiation of ultraviolet beams during the formation of the grating 6. The clad layer mode combination loss can be eliminated by two-step irradiation, namely, the first irradiation through a phase mask for forming a grating, which is performed until the increasing index of refraction reaches a target value, and the subsequent second irradiation which is performed without the phase mask in order to uniformly irradiate the area in which the grating 6 was formed.

While this method can eliminate the clad layer mode combination loss in the transmission band (i.e., the shorter wavelength side of the light blocking band), another problem arises, that is, the transmission loss in the light-blocking band is also decreased, and the monitoring light isolation ability is deteriorated. The third method of the present invention is proposed to overcome this problem.

An optical fiber 1, used as an optical waveguide in the third method, has a core 2 having a high index of refraction, and a clad layer 5 having a low index of refraction, as in the first and second methods shown in FIGS. 4 and 14. Prior to forming a grating 6, an exposed portion of the optical fiber 1 is subjected to pressurized hydrogen treatment under a pressure of 200 atm at a normal temperature for three (3) to twenty (20) days for the purpose of improving the optical inductive property.

A phase mask 13 is positioned so as to face a plane P including the core 2 with a space between the mask and the optical fiber 1. A selected area on the optical fiber 1 is irradiated by ultraviolet beams L emitted by an excimer laser (not shown) through the phase mask 13 in order to form a grating in that area. The mask pitch of the phase mask 13 is 1138 µm, the zero-order diffraction light transmissivity of the mask 13 is 1%, and the first-order diffraction light transmissivity is 40%. The excimer laser source has a wavelength of 248 nm and output of 350 mJ.

The ultraviolet beams L emitted from the excimer laser source become diffracted light upon having passed through the phase mask 14, and this diffracted light strikes the selected area on the optical fiber 1. This diffracted light causes the index of refraction of the core 2 to increase because of optical inductive phenomenon caused by germanium (Ge) doped in the core 2. There is no change in the index of refraction of other areas on which the diffraction light did not strike. Consequently, a grating 5 is formed on the selected area of the optical fiber 1 such that the index of refraction varies between high and low periodically along the optical axis of the optical fiber 1.

As a feature of this method, the two-step irradiation, the first irradiation through the phase mask 13 and the second irradiation without the mask 13, is performed, and the first irradiation is terminated before the increasing index of refraction reaches a target value.

Figure 21:
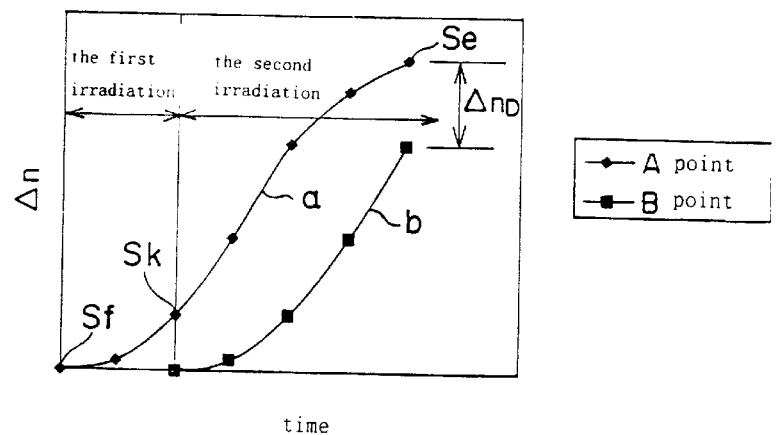
FIG. 21 is a graph showing increases of the index of refraction as a function of ultraviolet-ray irradiation time.

FIG. 21 shows the relationship between the irradiation time and a change Δn in the index of refraction. The curve "a" in FIG. 21 shows the change of the index of refraction from the irradiation starting point $S_f$ to the target point $S_e$ as a function of time. The index of refraction increases gently for a while after the irradiation was started. When the index of refraction reaches and exceeds $S_k$, it drastically increases, and the increase becomes gentle again as it approaches the target point $S_e$. When reaching $S_e$ as a saturation point, the index of refraction does not increase any more, even if the ultraviolet irradiation is continued. In the third method, the target value may be defined by a rate of change of the index of refraction at and immediately before the saturation point $S_e$.

Figure 22:
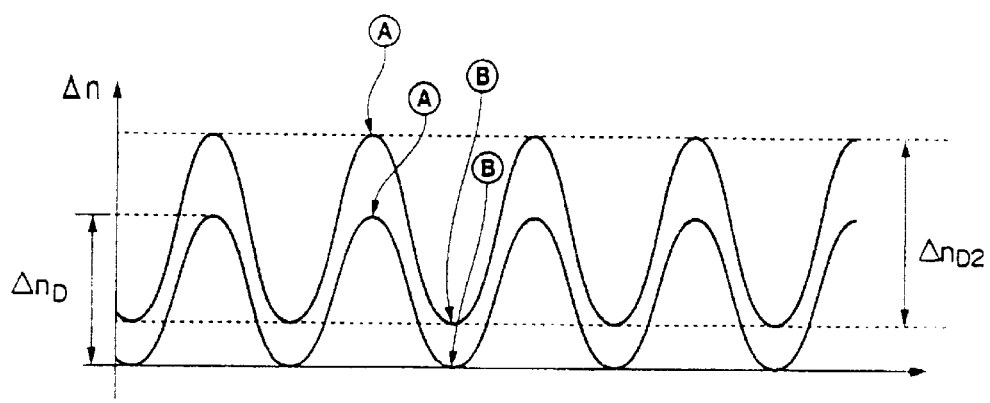
FIG. 22 illustrates changes of the index of refraction due to the grating along the longitudinal axis of the optical fiber.

In manufacturing the grating-type optical component, the first irradiation using the phase mask 13 is terminated when the index of refraction reaches the point $S_k$, at and after which the index of refraction drastically increases. Then, the phase mask is removed, and the second irradiation is started. The index of refraction increases from the point $S_k$ following the curve "a". The second irradiation is terminated when the index of refraction reaches the target point $S_e$. During the second irradiation, the index of refraction of the base area of the core 2, which did not receive the first ultraviolet irradiation because of the phase mask 13, increases along the curve "b" shown in FIG. 21. As a result, a difference $\Delta n_D$ is produced between the high index of refraction area and the low index of refraction area (i.e., the base area). Thus, as shown in FIG. 22, the high index of refraction areas (points A) and the low index of refraction areas (points B) are periodically arranged on the core 2 along the longitudinal axis, whereby a grating 6 is completed.

Ideally, the two-step irradiation should be performed while monitoring the increasing index of refraction; however, it is difficult to actually monitor the change of the index of refraction. Accordingly, in this method, the irradiation is performed while measuring the transmission loss of the optical fiber 1 using a spectrum analyzer because the index of refraction of the grating 6 is substantially proportional to the transmission loss of the optical fiber 1. In order to observe the transmission loss, a white light beam emitted by a white light source is introduced into the optical fiber 1 from its one end, and the spectrum analyzer positioned at the other end of the optical fiber 1 detects the exit light to measure the transmission loss.

As has been explained, the first irradiation is terminated when the transmission loss reaches a value corresponding to the point $S_k$, at which the increasing rate of the index of refraction drastically change, and the second irradiation is terminated when the transmission loss reaches a value corresponding to the target point $S_e$.

Because the first irradiation using the phase mask 13 is terminated before the increasing index of refraction reaches the target value, the grating formation time using the phase mask 13 is shortened, and the clad layer mode combination loss arising near the transmission band on the shorter wavelength side of the light-blocking band can be reduced. This clad layer mode combination loss is substantially eliminated by the subsequent second irradiation without the phase mask 13, which allows reliable signal transmission. Although the logical reason why the second irradiation without using the phase mask 13 can eliminate the clad layer mode combination loss caused by the first irradiation using the phase mask 13 has not been made clear, the fact is actually proved and confirmed through repeated experiment at a high reproducibility.

In addition, this two-step irradiation, in which the first irradiation is terminated before the index of refraction reaches the target value, can maintain stable and sufficient transmission loss at the light-blocking band and, therefore, the light component reflected by the light-blocking band of the grating is reliably extracted as monitoring light without intensity drop.

The fact that the two-step irradiation can reduce the transmission loss at the light-blocking band was also proved and confirmed through repeated experiment. The inventors infer the logical reason of this fact as follows:

The transmission loss at the light-blocking band depends on the difference $\Delta n_D$ between the high index of refraction area and the base area, as shown in FIGS. 21 and 22, and the grater the difference $\Delta n_D$ of the index of refraction, the greater the transmission loss. If the first irradiation through the phase mask 13 is terminated at $S_k$, and if the second irradiation is performed without the phase mask 13, then the index of refraction of the area which was irradiated by ultraviolet beams during the first irradiation continuously and drastically increases from the point of $S_k$ along the curve "a".

On the other hand, the index of refraction of the base area which did not receive the ultraviolet irradiation during the first irradiation starts gently increasing upon the beginning of the second irradiation, as shown by the curve "b" in FIG. 21. Thus, the difference between the high index of refraction area and the base area becomes larger as second irradiation proceeds than at the beginning of the second irradiation. Since sufficiently large difference $\Delta n_D$ is obtained by the end of the second irradiation, the transmission loss at the light-blocking band also becomes sufficiently large, and monitoring light having a sufficient intensity can be extracted.

If the first irradiation using the phase mask 13 is performed until the index of refraction reaches the target value, the index of refraction does not increase any longer during the second irradiation (for eliminating the clad layer mode combination loss generated by the first irradiation) because the index of refraction has already risen, while the index of refraction of the base area increases as time passes during the second irradiation. This means that the difference between the high index of refraction area and the base area decreases. This decreased difference $\Delta n_{D2}$ is indicated by the dotted broken line in FIG. 22. As a result, the transmission loss at the light-blocking band becomes smaller, and the intensity of monitoring light reflected by the grating 6 drops.

Therefore, in the third method, the first irradiation is terminated at $S_k$ before the index of refraction of the grating area reaches the target value, whereby large $\Delta n_D$, and therefore, sufficient and stable light transmission loss at the light-blocking band are obtained. This method can provide an ideal grating-type optical component which has a small clad layer mode combination loss at the transmission band and a large transmission loss at the light-blocking band.

In the actual manufacturing of the third method, a single-mode fiber is used as a waveguide. A selected area of the single-mode fiber, in which a grating is to be formed, is exposed, and is subjected to pressurized hydrogen treatment under a pressure of 15.0 MPa for 21 days.

Figure 23A:
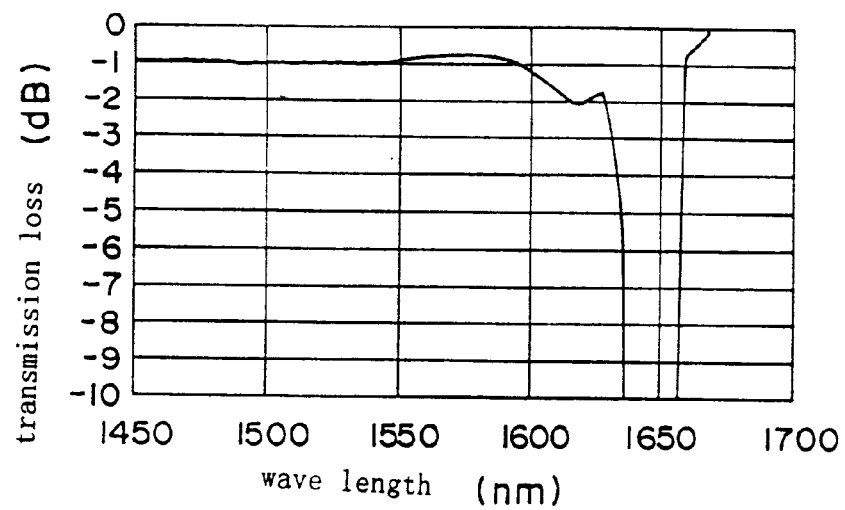
FIG. 23 is a graph showing the transmission loss of the optical component manufactured by the method of the sixth embodiment of the invention as a function of wavelength.
FIG. 23B is an enlarged view of FIG. 23A focusing on the range near 1650 nm.
Figure 23B:
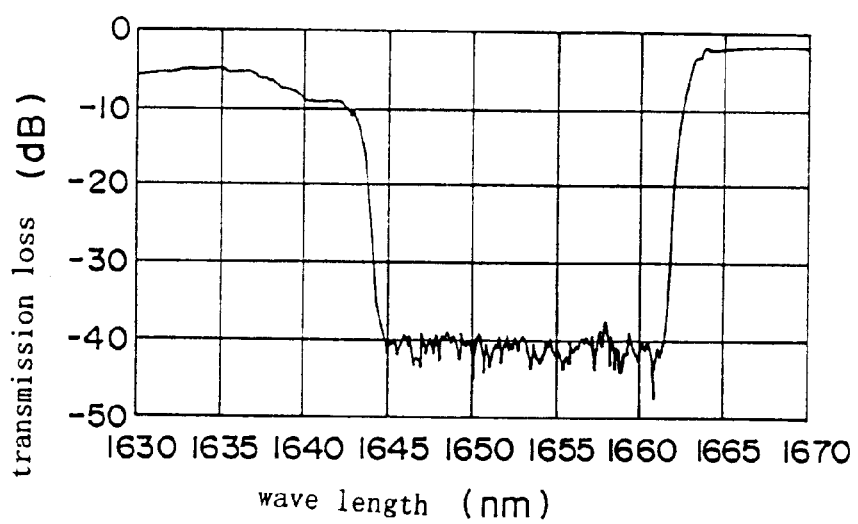

First ultraviolet irradiation was performed using an excimer laser source having a frequency of 50 Hz for 25 minutes in order to irradiate the selected area of the single-mode fiber through a phase mask. Then, the phase mask is removed, and second ultraviolet irradiation was performed at a frequency of 50 Hz for 15 minutes. The light transmissivity of this grating-type optical component with respect to signal light is shown in FIG. 23A. FIG. 23B is an enlarged view of FIG. 23A focusing on the light-blocking band. In this example, the transmission loss at the 1550 nm transmission band is about 0.5 dB, while the transmission loss at the 1650 nm light-blocking band is about 30 dB. Thus, an ideal grating-type optical component having a small clad layer mode combination loss at the signal transmission band and a large isolation ability at the light-blocking band is achieved.

The grating-type optical component and the manufacturing method according to the present invention are not limited to the examples described above, and there are many changes and substitutions within the scope of the present invention. For example, in the first embodiment, only single irradiation may be performed, instead of the two-step irradiation (i.e., first irradiation of diffraction or interference light and second irradiation of uniform light), because the optical fiber used in the first embodiment has a gentle distribution profile of index of refraction with less gap from the change of the transmission mode at the core-clad layer boundary, unlike the conventional fiber whose distribution profile of the index of refraction in the core 2 is rectangular as shown by the solid line "a" in FIG. 5. Because of this distribution profile of index of refraction, a grating-type optical component having less clad layer mode combination loss can be manufactured even by single irradiation of ultraviolet beams.

The types and the distribution profiles of the index of refraction of the optical fibers used in the grating-type optical component are not limited to the examples described above. In addition, the waveguide may be a plane optical waveguide formed on a substrate, in place of optical fibers.

In the third method, the first irradiation using the phase mask is terminated at a desired point $S_k$ (FIG. 21), at which the rate of change of the index of refraction drastically increases, by monitoring the transmission loss or the rate of change of the transmission loss. However, termination of the first irradiation may be controlled by monitoring the time elapse from the beginning of the irradiation. In this case, time required for the index of refraction of the optical fiber used to reach $S_k$ is determined in advance, and time elapse is counted by, for example, a timer. When a predetermined time has passed, the first irradiation is terminated automatically or manually. Similarly, the second irradiation can also be terminated when the index of refraction has reached the target value by counting time from the beginning of the second irradiation, or monitoring the transmission loss or the rate of change of the transmission loss.

The termination of the first irradiation is not limited to the reference point $S_k$, at which the index of refraction drastically rises. Another reference point which can reduce the clad layer mode combination loss at the signal transmission band and maintain a large transmission loss at the light-blocking band may be determined through experiment, and the value corresponding to this reference point may be set by parameters, such as a transmission loss, a rate of change of the transmission loss, or time elapsed.

The mask used in the first irradiation is not limited to the phase mask 13. Any suitable means can be used as long as exposed areas and non-exposed areas to the ultraviolet irradiation are periodically arranged along the longitudinal axis of the optical fiber.

The second irradiation may be performed from the same direction as or the opposite direction to the first irradiation.

Any suitable light source, other than the excimer laser source, may be used.

What is claimed is:

1. A method for manufacturing a grating-type optical component which comprises an optical waveguide having a core, said method comprising the steps of:

irradiating said optical waveguide with ultraviolet beams from a first side of said optical waveguide toward a plane including said core through a phase mask; and irradiating an entire surface of said optical waveguide directly with ultraviolet beams from a second side of said optical waveguide.

2. A method for manufacturing a grating-type optical component which comprises an optical waveguide having a core and a clad layer, said method comprising the steps of:

giving first irradiation of ultraviolet beams to a desired area of said optical waveguide through a mask in order to increase an index of refraction of said core, said first irradiation being conducted, while monitoring any one of a transmission loss of said waveguide and a time elapsed from a beginning of said first irradiation;

terminating said first irradiation before said index of refraction of said core, irradiated by said ultraviolet beams, reaches a target value, said first irradiation being terminated when any one of said transmission loss and a rate of change of said transmission loss reaches a predetermined value and when said time elapsed from said beginning of said first irradiation reaches a predetermined value; and thereafter, giving second irradiation of ultraviolet beams to said desired area directly without said mask, thereby forming a grating in which high-refraction areas, due to double irradiation, and low-refraction areas, due to blocking of the ultraviolet beams by the mask, are periodically arranged along a longitudinal axis of said optical waveguide.

3. The method according to claim 2, wherein said second irradiation is conducted, while monitoring any one of said transmission loss of said waveguide and said time elapsed from said beginning of said first irradiation, and said second irradiation is terminated when any one of said transmission loss, said rate of change of said transmission loss reaches a predetermined value and when said time elapsed from said beginning of said first irradiation reaches a predetermined value.

4. The method according to claims 2 ro 3, wherein said predetermined value for any one of said transmission loss, said rate of change of said transmission loss, and said predetermined value for said time elapsed set for a termination of said first irradiation, correspond to a point, at which said transmission loss drastically changes during said first irradiation.

5. The method according to claim 2, wherein said first irradiation of ultraviolet beams forms a grating having a light-blocking wavelength band of about 1650 nm, and said second irradiation of ultraviolet beams reduces a clad layer mode combination loss of a wavelength band of about 1550 nm.

6. The method according to claim 3, wherein said first irradiation of ultraviolet beams forms a grating having a light-blocking wavelength band of about 1650 nm, and said second irradiation of ultraviolet beams reduces a clad layer mode combination loss of a wavelength band of about 1550 nm.

7. The method according to claim 4, wherein said first irradiation of ultraviolet beams forms a grating having a light-blocking wavelength band of about 1650 nm, and said second irradiation of ultraviolet beams reduces a clad layer mode combination loss of a wavelength band of about 1550 nm.

* * * * *